US008308855B2

(12) United States Patent  (10) Patent No.: US 8,308,855 B2
Togashi et al.  (45) Date of Patent: Nov. 13, 2012

(54) FILTER ELEMENT AND FILTER UNIT

(75) Inventors: Ryoichi Togashi, Otsu (JP); Yuichiro Hayashi, Otsu (JP); Naoki Yamaga, Otsu (JP)

(73) Assignee: Toray Industries, Inc., Tokyo (JP)

( * ) Notice: Subject to any disclaimer, the term of this patent is extended or adjusted under 35 U.S.C. 154(b) by 285 days.

(21) Appl. No.: 12/680,365

(22) PCT Filed: Sep. 10, 2008

(86) PCT No.: PCT/JP2008/066277
§ 371 (c)(1),
(2), (4) Date: Mar. 26, 2010

(87) PCT Pub. No.: WO2009/041257
PCT Pub. Date: Apr. 2, 2009

(65) Prior Publication Data
US 2010/0212506 A1  Aug. 26, 2010

(30) Foreign Application Priority Data

Sep. 28, 2007 (JP) ................................ 2007-253728

(51) Int. Cl.
*B01D 53/02* (2006.01)
(52) U.S. Cl. .............................. 96/134; 55/524; 96/154
(58) Field of Classification Search ............... 55/528, 55/320, 330, 333, 357, 471, 472, 498, 514, 55/521, 524; 264/49, 344; 428/398; 502/62; 521/63; 96/135, 138, 140, 142, 153, 134, 96/108, 154
See application file for complete search history.

(56) References Cited

U.S. PATENT DOCUMENTS

| 4,107,384 A | * | 8/1978 | Musha et al. ................. 428/398 |
| 5,641,343 A | * | 6/1997 | Frey ................................ 96/135 |
| 2006/0172639 A1 | | 8/2006 | Yamada et al. |
| 2009/0093359 A1 | * | 4/2009 | Seto et al. ....................... 502/62 |

FOREIGN PATENT DOCUMENTS

| JP | 2074505 A | 3/1992 |
| JP | 2000117024 A | 4/2000 |
| JP | 2000279505 A | 10/2000 |
| JP | 2002001020 | 1/2002 |
| JP | 2005111337 A | 4/2005 |
| JP | 2006136809 A | 6/2006 |
| JP | 2007031865 A | 2/2007 |
| JP | 2007130632 A | 5/2007 |
| JP | 2007175567 A | 7/2007 |
| JP | 2007231500 A | 9/2007 |
| JP | 2007237167 A | 9/2007 |
| WO | WO 2004/087293 A1 | 10/2004 |

OTHER PUBLICATIONS

International Search Report dated Oct. 14, 2008, Application No. PCT/JP2008/066277.

* cited by examiner

*Primary Examiner* — Duane Smith
*Assistant Examiner* — Minh-Chau Pham
(74) *Attorney, Agent, or Firm* — RatnerPrestia

(57) ABSTRACT

By providing a thin-type deodorizing filtering medium which can be mini-pleats-processed, a washing-regenerable filtering medium in which the deodorizing filtering medium and a dust collecting filtering medium are integrated and, further, a low pressure drop/dust collecting deodorizing filter unit which can be subjected to large air volume treatment are provided. A non-crimped single fiber having a specified Young's modulus and a specified fineness is used to prepare a nonwoven fabric sheet having high stiffness, and a gas adsorbing substance is adhered and fixed thereto.

15 Claims, No Drawings

FILTER ELEMENT AND FILTER UNIT

This application is a U.S. National Phase Application of PCT International Application No. PCT/JP2008/066277, filed Sep. 10, 2008, which claims priority to Japanese Patent Application No. 2007-253728, filed Sep. 28, 2007, the content of these applications being incorporated by reference herein in their entirety.

FIELD OF THE INVENTION

The present invention relates to a filtering medium which can be subjected to large air volume treatment at a low pressure drop, and has deodorizing property, and a filter unit using the same.

BACKGROUND OF THE INVENTION

As performance required for an air cleaner, there are fundamental performance such as low noise, electric power saving, high dust collection, and high deodorization. In addition, in recent years, washing and reuse of a filter unit have been required.

Previously, many of filter portions set in the air cleaner have been arranged so that they are separated into a dust collecting portion and a deodorizing portion. Currently, many of dust collecting portions mainly used in a market are HEPA filtering medium, and a deodorizing portion is plate-like in many cases. Since the dust collecting portion is a filtering medium of HEPA (a ultrahigh performance filtering medium which can collect 99.97% or more 0.3µ particles) performance having a high airflow resistance, the portion is arranged separately from the deodorizing portion. In addition, in order to reduce a structure pressure drop as a filter unit and, at the same time, perform large air volume treatment in conformity with treatment ability at the deodorizing portion, mini-pleats processing at 4 millimeter pitch or less is required to increase an area of a filtering medium to be used. For this reason, the dust collecting portion and the deodorizing portion are arranged in such a separated shape.

However, for washing and reuse of the filter portion which have been required in recent years, a filter having such a structure is necessary to be washed two times, one time for the dust collecting portion and the other time for the deodorizing portion, and integration of the dust collecting portion and the deodorizing portion is required for simplicity. This integration is effective in not only simplicity of washing, but also ease of filter exchange and cost saving. However, since simple addition of the deodorizing function to the dust collecting portion increases a thickness of the filtering medium, an amount of the filtering medium which can be accommodated in the unit is decreased, and a unit pressure drop due to rise in a structure pressure drop is increased. Decrease of filtering medium and increase of unit pressure drop occur problems such as reduction in a treatment air volume, increase in a noise, increase in consumed electric power, and reduction in a collecting efficiency, therefore integration is extremely difficult.

For integration, Patent Literature 1 discloses an air cleaning filter element obtained by immersing a woven fabric, a knitted fabric or a nonwoven fabric in a latex liquid containing an adsorbent, drying the fabric after attachment of the adsorbent to obtain a sheet with the adsorbent attached thereto, and subjecting a filtering medium to which an electret nonwoven fabric is adhered to pleats processing. However, in an aspect specifically described in Example of this literature, a substrate to which the adsorbent is attached is a knitted fabric or a urethane foam, a thickness is as thick as 1 mm or more to 3 mm. A thick filtering medium like this does not suit a filtering medium which is subjected to mini-pleats processing for large air volume treatment.

In addition, Patent Literature 2 discloses a deodorizing electret filter in which an electret nonwoven fabric is laminated on a deodorizing filter obtained by supporting a deodorizing agent on an air-permeable substrate through coating or immersion. A dry nonwoven fabric and a wet type non-woven material are disclosed as examples of a nonwoven fabric of the air-permeable substrate. As a specific nonwoven fabric, a resin bond (chemical bond) nonwoven fabric obtained by fixing fibers to a dry nonwoven fabric consisting of a polyacrylate fiber and a polyvinyl chloride fiber using vinylidene chloride, is merely disclosed. However, since the dry nonwoven fabric has a high weight variation rate, a deodorization rate is easily reduced. In addition, in the case of a crimped fiber, since loosing property due to crimping necessarily remains, even when fixed with a resin, the fabric is easily stretched, and becomes extremely soft, being not suitable for pleats processing.

Next, Patent Literature 3 discloses a deodorizing sheet in which a porous material having a specified particle diameter range (e.g. 60 to 600 µm) is wet-adhered and fixed on a nonwoven fabric, as a structure of a filtering medium. In the deodorizing sheet produced by such a method, big particles of a porous material are held between fibers of a nonwoven fabric, therefore, a thickness of the filtering medium becomes great, and an area of the filtering medium which can be accommodated in the filter unit is decreased. Further, when the sheet is pleats-processed, since a pressure drop at a folded back part of the filtering medium easily becomes great, it is difficult to reduce a pressure drop. In addition, since the porous material is wet-adhered and fixed, even if small particles are used, particles are densely deposited on particles and a space required for airflow becomes narrow, therefore, a pressure drop is easily increased.

Like this, it cannot be said that all of the previous techniques for integrating dust collection and deodorization is effective technique relating to manufacturing of a filtering medium suitable for mini-pleats processing.

On the other hand, in order to perform large air volume treatment with a mini-pleats-type filter at a low pressure drop, it is important to reduce a pressure drop of the filtering medium itself, but it is also important to reduce a structure pressure drop, because the pressure drop of the filter unit is a sum of the pressure drop of the filtering medium itself, and the structure pressure drop generated when the filtering medium is pleats-processed and accommodated. For this reason, a hard filtering medium which is thin, and is not deformed with an air pressure is necessary.

Patent Literature 4 shows trial of suppressing generation of a structure pressure drop by thinning and hardening a filtering medium, and discloses application of a wet type nonwoven material including modified cross-section yarns of a rayon fibers or glass fibers, as a fiber constituting a support of the filtering medium. However, the filtering medium including thick glass fibers have a problem on safety and hygiene because the glass fibers are broken and flown at a pleats processing step. In addition, since when a support having a high fiber density is coated with a gas adsorbing substance, clogging occurs frequently, the pressure drop of the filtering medium becomes high.

Further, Patent Literatures 5 and 6 disclose that a filtering medium is composed of a fiber having a high Young's modulus to enhance dimensional stability and a strength for an air pressure.

Among them, Patent Literature 5 relates to a filtering medium for a bag filter, and heat resistant fibers such as polyphenylene sulfite fibers having a Young's modulus of 20 cN/dtex or more. However, since this filtering medium is constructed of a nonwoven fabric or a woven fabric obtained by entangling crimped fibers with needle punching into a high-bulky form, and the fabric is not fixed between the said fibers, the medium is deformed with an air pressure, and a structure pressure drop is easily caused.

In addition, Patent Literature 6 discloses a process for producing a flame-retardant filtering medium using polyvinyl alcohol fibers and polyester fibers by a paper making method, and it is described that, as a feature of the paper making method, fibers having different thicknesses and lengths can be used, and fibers having a high Young's modulus can be also used. However, in this literature, it is only described that, when the paper making method is used, fibers having a high Young's modulus can be used and a specific numerical value regarding a Young's modulus of a fiber is not described at all. For this reason, there is a possibility that a filtering medium in which, when a gas adsorbing substance is adhered, clogging occurs, and air permeability is remarkably reduced in some cases, is obtained.

Based on the above reasons, previously, a filter unit in which both functions of dust collection and deodorization can be performed by one filtering medium, and which can be subjected to large air volume treatment at a low pressure drop, was not present.

Patent Literature 1: Japanese Patent Application Laid-Open (JP-A) No. 4-74505
Patent Literature 2: JP-A No. 2000-279505
Patent Literature 3: JP-A No. 2000-117024
Patent Literature 4: JP-A No. 2002-1020
Patent Literature 5: International Publication WO 04/87293
Patent Literature 6: JP-A No. 2006-136809

SUMMARY OF THE INVENTION

The present invention provides a thin-type deodorizing filtering medium which can be mini-pleats-processed, thereby, provide a filtering medium in which the deodorizing filtering medium and a dust collecting filtering medium are integrated, and which can be reproduced by washing and, further, provide a low pressure drop/dust collecting and deodorizing filter unit which can be subjected to large air volume treatment.

Embodiments of the present invention may have any of the following constructions.
(1) A filtering medium including a non-woven fabric sheet containing mainly organic fibers in which single fibers are fixed, and a gas adsorbing substance having a particle diameter of 40 μm or less adhered to the nonwoven fabric sheet, wherein an apparent density is 0.3 g/cm$^3$ or less, and a specific strength at 1% elongation is 150 N·cm/g or more.
(2) The filtering medium according to (1), wherein the nonwoven fabric sheet contains non-crimped single fibers having a Young's modulus of 80 cN/dtex or more at a ratio of 50% or more of a total fiber mass, and contains non-crimped single fibers having a fineness of 7 cN/dtex or more at a ratio of 20% or more of a total fiber mass, and an apparent density is 0.17 g/cm$^3$ or less.
(3) The filtering medium according to (1) or (2), wherein the nonwoven fabric sheet has a rough and fine structure.
(4) The filtering medium according to (3), wherein the nonwoven fabric having a rough and fine structure has an efficiency of collecting 0.3 to 0.5 μm particles of 5 to 50%.
(5) The filtering medium according to any one of (1) to (4), wherein a weight variation rate is 25% or less.
(6) The filtering medium according to any one of (1) to (5), wherein a plurality of gas adsorbing substances are coated in layers in a direction of a filtering medium thickness.
(7) The filtering medium according to any one of (1) to (6), wherein the gas adsorbing substance is active carbon, and a pH of the filtering medium with the gas absorbing substance adhered thereto is 4.5 to 7.5.
(8) The filtering medium according to any one of (1) to (7), wherein the gas adsorbing substance is a mixed substance containing porous silica and a dihydrazide compound and/or a mixed substance containing active carbon and a dihydrazide compound.
(9) The filtering medium according to any one of (1) to (8), wherein the gas adsorbing substance is a mixed substance containing zinc oxide and sodium bicarbonate.
(10) The filtering medium according to any one of (1) to (9), wherein the gas adsorbing substance is adhered and fixed to the nonwoven fabric sheet with a water-soluble resin.
(11) A high dust collecting filtering medium wherein an electret nonwoven fabric is integrally laminated on the filtering medium as defined in any one of (1) to (10).
(12) A filter unit using the filtering medium as defined in any one of (1) to (10), or the high dust collecting filtering medium as defined in (11).

According to an embodiment of the present invention, a filtering medium and a filter unit which can be mini-pleats-processed, has a high air permeation degree, can be subjected to large air volume treatment, and has practical deodorizing property can be provided. That is, by a construction of an embodiment of the present invention, a specific strength at 1% elongation can be 150 N·cm/g or more while an apparent density as the filtering medium is as low as 0.3 g/cm$^3$ or less, and a deodorizing filtering medium having a low elongation and a high strength can be obtained.

For this reason, it becomes possible to obtain a low pressure drop dust collecting deodorizing filter unit which has little structure pressure drop occurrence even when condition for assembling a mini-pleats filter unit similar to that of the previous dust collecting filter is taken. Further, since conversion into mini-pleats integrally with an electret nonwoven fabric is possible, a filtering medium also excellent in washing regeneration property can be obtained.

In addition, by making a fiber aggregate constituting a nonwoven fabric sheet have a low weight variation rate, deodorizing property and dust retaining function can be further enhanced.

DETAILED DESCRIPTION OF THE INVENTION

The filtering medium in an embodiment of the present invention contains non-crimped single fiber S having a Young's modulus of 80 cN/dtex or more at a ratio of 50% or more of a total fiber mass, and contains non-crimped single fiber S having a fineness of 7 dtex or more at a ratio of 20% or more of a total fiber mass and, further, wherein a gas adsorbing substance having a particle diameter of 40 μm or less is adhered to a nonwoven fabric sheet in which the sheet is fixed between single fibers with a resin having a high glass transition temperature of the fiber so as to have an apparent density of 0.17 g/cm$^3$ or less, and is characterized in that an apparent density as the filtering medium is 0.3 g/cm$^3$ or less, and a specific strength at 1% elongation is 150 N·cm/g or more.

Herein, the necessary property for a filtering medium used in a filter unit for a home air cleaner, building/factory air conditioning, and for air conditioning facility mounted in cars is low pressure drop property for treating a large air volume, generating no structure pressure drop, thinness, and low elongation and high strength property such that the medium is not deformed with an air pressure. Further, a filtering medium structure retaining high dust collecting property and a gap amount so that clogging occurs with difficulty, is preferred. In addition, a structure pressure drop as used in the present invention refers to a remaining numerical value obtained by subtracting a pressure drop generated in proportion with a filtering air rate through the filtering medium, from a pressure drop generated when the air is flown through a filter unit in which pleats-processed filtering medium is accommodated.

A means which has been previously taken to reduce a unit pressure drop is to reduce a pressure drop due to a material of the filtering medium. For this reason, generally, degrease in a fiber amount of the filtering medium, and reduction in a fiber density by increasing a fiber diameter, and making the filtering medium bulky have been performed. However, by this method, since a pressure drop of a material itself of the filtering medium is reduced, but a force for fixing the fabric between fibers of the filtering medium becomes weak, stretching occurs in the filtering medium with an air pressure upon use, and a structure pressure drop is conversely increased. In a filtering medium in which an electretification processing sheet is further laminated in order to increase collecting performance, since an air pressure is further increased, a structure pressure drop is increased, and it is more difficult to reduce a pressure drop as a unit.

However, according to an aspect of the present invention, even when the filtering medium is of a low weight extremely rough structure so that an apparent density of 0.3 g/cm$^3$ or less is obtained, since the filtering medium contains non-crimped single fibers having a Young's modulus of 80 cN/dtex or more at a ratio of 50% or more of a total fiber mass, and contains non-crimpled single fibers having a fineness of 7 dtex or more at a ratio of 20% or more of a total fiber mass and, further, the filtering medium is fixed between single fibers with a resin having a high glass transition point temperature, the filtering medium has low elongation and high strength property having a specific strength at 1% elongation of 150 N·cm/g or more. As a result, even when a mini-pleats processing at a narrow pleats interval is performed, a structure pressure drop occurs less frequency, and thinning of the filtering medium is allowed to perform large air volume treatment.

Herein, a specific strength at 1% elongation will be described. Previously, as an index for expressing a hardness of the filtering medium, bending stiffness defined by JIS-L1085 (1977) B method has been widely used, but since the bending stiffness is an index having no relationship with a thickness, a weight and air permeation degree of the filtering medium, there are many filtering media exhibiting the same bending stiffness value even in filtering medium constructions different in a filtering medium thickness, a filtering medium weight, and a filtering medium air permeation degree. For this reason, even in the case of filtering media exhibiting the same bending stiffness, if they have different thicknesses or air permeation degrees, pressure drop performances in a filter unit accommodating the filter medium were different. That is, since a degree of occurrence of structure pressure drop is different, a difference was generated. Thus, by the bending stiffness which has been previously used as an index for expressing a hardness of the filtering medium, relative comparison was possible between filtering media in which filtering medium construction condition does not depend on many variables, but it was unsuitable as an index for measuring an occurrence degree of structure pressure drop which influences on unit pressure drop construction.

Then, the present inventors studied a degree of occurrence of structure pressure drop and, as a result, found out that, in a high air permeable nonwoven fabric having an apparent density of 0.3 g/cm$^3$ or less, even when a thickness, a weight, and a process of production of the nonwoven fabric are different, a specific strength (tensile strength [N/cm$^2$]/apparent density of the nonwoven fabric [g/cm$^3$]) manifested when a nonwoven fabric of a 5 cm width is 1% elongated, is important.

The specific strength shows a relationship between an elongation and a strength for a filtering medium unit mass, and a filtering medium having a high specific strength is elongated with difficulty, even when an air pressure is applied, deformation of a pleats shape occurs with difficulty, and a low pressure drop filter unit having little occurrence of structure pressure drop can be produced.

Then, an essential feature of a substrate for attaining a specific strength by adhesion of a gas adsorbing substance, that is, a nonwoven fabric sheet will be described.

In an embodiment of the present invention, a gas adsorbing substance is adhered to the nonwoven fabric sheet and, when upon production of the nonwoven fabric sheet, the sheet is wet-made by adding a particulate substance such as active carbon, or a gas adsorbing substance is applied to the previously used dry chemical bond nonwoven fabric, a pressure drop is easily increased. For this reason, a mini-pleats-type low pressure drop long life deodorizing filter unit having a crest height of 35 mm, and a pleats interval of 4 mm or less, and having a dusting efficiency corresponding to that of the HEPA filtering medium could not be manufactured with the previous dry chemical bond nonwoven fabric.

However, the filtering medium in an embodiment of the present invention contains non-crimped single fibers having a Young's modulus of 80 cN/dtex or more at a ratio of 50% or more of a total fiber mass, and contains non-crimped single fibers having a fineness of 7 dtex or more at a ratio of 20% or more and, further, is such that a gas adsorbing substance is adhered and fixed, with a resin, to a single yarn constituting a special nonwoven fabric sheet in which the sheet is fixed between single fibers with a resin having a high glass transition point temperature, and has such a hardness that the medium is not deformed even with an air pressure in spite of thinness and a low pressure drop. For this reason, even in a high collecting performance filtering medium in which an electret melt-blown HEPA nonwoven fabric having a high pressure drop is adhesion-integrated, it is possible to provide a filter unit which has a small structure pressure drop generated by mini-pleats processing, and can be subjected to large air volume treatment with a low pressure drop.

The structural characteristic desired for the nonwoven fabric sheet to which a gas adsorbing substance is adhered is as follows: since the filtering medium plays both functions of dust collection and deodorization, such a property is required that a gap amount not considerably increasing a pressure drop even when a gas adsorbing substance is adhered, and a gap amount retaining dusts and smoke of tobacco in the captured air are possessed, and the sheet is of a low pressure drop, and is not elongated or deformed with an air pressure. Therefore, a rough nonwoven fabric sheet having a low apparent density is suitable for aspects of the present invention.

However, even when a gas adsorbing substance is adhered to the previous dry nonwoven fabric, it is soft, and is not suitable for mini-pleats processing. In addition, in the case of a low weight, a weight variation is easily increased, and it is difficult to increase a deodorizing rate. Then, fiber construction of the nonwoven fabric sheet as a carrier of a gas adsorbing substance has been intensively studied, and it has been found out that non-crimped single fibers having a Young's modulus of 80 cN/dtex or more is contained at a ratio of 50% or more of a total fiber mass, and non-crimped single fibers having a fineness of 7 dtex or more is contained at a ratio of 20% or more of a total fiber mass and, further, the sheet is fixed between single fibers with a resin, thereby, such a characteristic is possessed that the sheet is not elongated or deformed with an air pressure while a high gap amount at an apparent density as the nonwoven fabric sheet of 0.17 g/cm³ or less is retained. Further, it has been found out that when a gas adsorbing substance having a particle diameter of 40 μm or less is adhered to such a nonwoven fabric sheet, also as the filtering medium, a specific strength at 1% elongation can be 150 N·cm/g or more while an apparent density is retained at 0.3 g/cm³ or less, and a thin-type filtering medium having a small pressure drop, which can be mini-pleats-processed, can be obtained. In addition, it is preferable as the nonwoven fabric sheet that a specific strength at 1% elongation is 300 N·cm/g or more.

Then, physical properties of a single fiber used for attaining a specific strength will be described.

In order to attain a specific strength of the filtering medium in an embodiment of the present invention, it is necessary that the nonwoven fabric sheet, at least, contains non-crimped single fibers having a Young's modulus of 80 cN/dtex or more at a ratio of 50% or more of a total fiber mass. A Young's modulus of a preferable single fiber is 100 cN/dtex or more, more preferably 150 cN/dtex or more, further preferably 250 cN/dtex or more.

On the other hand, it is preferable that a Young's modulus of a single fiber is 3000 cN/dtex or less. The reason is as follows: when a single fiber having a Young's modulus of more than 3000 cN/dtex, specifically, when an aramide fiber (4400 cN/dtex or more), ultrahigh molecular weight polyethylene (8000 cN/dtex or more), or a glass fiber (326000 cN/dtex or more) is used, depending on a use amount and a fineness, a tensile breakage elongation of the nonwoven fabric sheet becomes 1.0% or less, and adverse influence such as reduction in a tearing strength, occurrence of nonwoven fabric sheet breakage without standing bending elongation at a pleats-processed crest portion, and sticking in a skin occurs. Therefore, it is not preferable to use a fiber having a Young's modulus of more than 3000 cN/dtex.

Based on the above reasons, a range of a suitable Young's modulus of a single fiber to be used is 80 to 3000 cN/dtex, more preferably 100 to 2000 cN/dtex. The range is further preferably 150 to 1350 cN/dtex, optimally 250 to 600 cN/dtex, and by adopting such a range, filtering medium breakage and reduction in a tearing strength at pleats processing are less frequent, and a nonwoven fabric sheet having little deformation with an air pressure is obtained.

In addition, since deformation of the filtering medium is caused by bending with an air pressure, it is extremely important, in one preferred aspect, to increase a bending resistance. The bending resistance, when a thickness of the filtering medium is increased, and a weight is increased, can be increased, but this increases an airflow resistance, narrows an air flow in interval, and becomes a factor for increase in a pressure drop, therefore, a thickness of the filtering medium cannot be increased. Then, in order to increase a bending resistance in a thin filtering medium, it is effective to manufacture a skeleton of a nonwoven fabric sheet using a 7 dtex or more thick single yarn at 20% or more of a total fiber mass.

Since the skeleton also has an object of forming a space for retaining coarse dusts, a thick single yarn having a high Young's modulus, which is bent with difficulty is suitable. Further, a single fiber provides a place to which a gas adsorbing substance is adhered. Since a gas adsorbing substance is suitably adhered without occupying a wide space compartmentized with a thick fiber, a pressure drop is not excessively increased. For this object, as a preferable single fiber of a skeleton constituting fiber, a single fiber having a fineness of 7 dtex or more is suitable. On the other hand, when a single fiber is too thick, the fiber sticks into a skin, therefore, a preferable fineness is in a range of 10 to 40 dtex, and a further optimal single yarn fineness is 15 to 25 dtex. In addition, it is preferable that a single fiber having such the fineness has a Young's modulus in the aforementioned range.

Stiffness possessed by a skeleton fiber having a high Young's modulus enables formation of a non-woven fabric sheet having a low apparent density. Further, when an incorporation rate of a single fiber satisfying both of such a Young's modulus and fineness is less than 20%, an apparent density of the nonwoven fabric sheet easily exceeds 0.17 g/cm³ and, when a gas adsorbing substance is adhered, clogging remarkably easily occurs, and an airflow resistance is easily increased. For this reason, it is good to consider a thickness and incorporation of a fiber so that an apparent density of the nonwoven fabric sheet becomes 0.17 g/cm³ or less. Therefore, it is necessary that a single fiber of such a Young's modulus and fineness is contained at a ratio of 20% or more of a total fiber mass. On the other hand, when the ratio exceeds 95%, weight fluctuation becomes great, and it becomes difficult to enhance deodorizing property as described later. For this reason, a preferable range is 90% or less, more preferably in a range of 40 to 90%, further preferably in a range of 50 to 85%.

Further, in an embodiment of the present invention, in order to reduce elongation deformation of the nonwoven fabric sheet, it is preferable that the nonwoven fabric sheet is constructed of a plurality of single fibers having different Young's modulus and finesses. Specifically, it is preferable to use a mixture of thin single yarns having a high Young's modulus and thick yarns having a high Young's modulus by mixing them. In the case of certain embodiments of the present invention, the sheet is fixed between single fibers, at only contact points between fibers. However, when in order to enhance a specific strength, a stiff short fiber, for example, a thick fiber having a fineness exceeding 10 dtex, and having a fiber length of around 5 to 12 mm is used, contact points between fibers where fibers are contacted are small, and the number of jointing points is extremely small as compared with a thin fiber. In addition, since the fiber is stiff, fibers are entangled with difficulty. As a result, when the nonwoven fabric sheet is constructed using only a thick fiber having high bending stiffness, contact points are slipped, and it is difficult to reduce elongation deformation without fully utilizing fiber physical properties. As strategy therefore, it is preferable to use thin single yarns of 1 to 6 dtex having a Young's modulus of 60 cN/dtex or more, preferably 90 cN/dtex or more, further preferably 150 cN/dtex or more, optimally 200 cN/dtex or more by mixing them. By doing this, since the number of fibers becomes great, contact places with thick fibers can be increased and, additionally, a part of fibers are entangled, so as to converge thick fibers. Since a resin for fixation is concentratedly adhered to contact points or entangled places, the resin fixation is effectively utilized, a force with fixing between fibers is enhanced, and a specific strength can be increased. In addition, a thin fiber can exert the function as a fiber for enhancing dust collecting property simultaneously. However, when an incorporation rate exceeds 30%, dust collecting property is increased, clogging easily occurs and, as a result, this can be a cause for reduction in a life. In addition, this can also be a cause for reduction in an air permeation degree. For this reason, it is preferable that the incorporation rate is 30% or less, more preferably 28% or less, further preferably 25% or less. On the other hand, when the incorporation rate is too small, since improvement in a specific strength cannot be expected, it is good that the incorporation rate is 5% or more, more preferably 10% or more.

In addition, particularly, when thick fibers having a single fiber fineness exceeding 10 dtex are used, a fiber length of the fiber is preferably 8 to 25 mm, further preferably 10 to 20 mm. When the length is more than 25 mm, fibers are converged into a bundle, and weight variation easily becomes great. In addition, when the length is less than 8 mm, number of the contact points between fibers becomes small, and even when the sheet is fixed between fibers, a sufficient tensile strength is not obtained, and it is difficult to reduce elongation.

Further, in an embodiment of the present invention, the aforementioned fiber is a non-crimpled single fiber. In the case of the non-crimped single fiber, since fiber deposition on the nonwoven fabric sheet becomes planar, orienting property of each of single fibers is one-dimensional, becoming into the state having no loosing property. For this reason, when an external force is applied to the nonwoven fabric sheet, since elongation accompanying with loose property is small, this is suitable in that a tensile resisting force depending on physical properties in a single fiber is easily generated immediately. In addition, in order to reduce a pressure drop as a filtering medium, crimped yarns may be mixed in a range acceptable to a specific strength, reducing an apparent density of the non-woven fabric sheet.

Furthermore, when the nonwoven fabric sheet is constructed only of thick fibers which become a skeleton, a dusting efficiency is easily reduced. For this reason, it is good to incorporate also a thin fiber of 1 to 6 dtex, thereby, try to maintain performance of collecting from a fine particle to a coarse particle, control a dust retaining amount and improve a deodorization rate.

As a fiber constituting the nonwoven fabric sheet, fibers such as a polyester fiber, a polyamide fiber, a polyvinyl alcohol fiber, a ultrahigh molecular weight polyethylene fiber, a polypropylene fiber, a polyaramide fiber, an inorganic fiber, and a carbon fiber can be used, but since an inorganic fiber such as a glass, and a carbon fiber have a high Young's modulus, but have a small breakage elongation of a single fiber of 4% or less, they are very easily broken, therefore, they are not preferable as a skeleton fiber. In addition, a polyaramide fiber is easily fibrillated at a wet preparation step, a Young's modulus becomes high with difficulty, and fluctuation is easily generated in an air permeation resistance, therefore, it is not very preferable. When a resin having a high glass transition point described later is impregnated into a fiber aggregate to make fiber fixation firm, dissolution and thermal shrinkage of a fiber occur at heating at a high temperature of 150 degree or higher in a dry heat treating step, the ultrahigh molecular weight polyethylene fiber is not preferable. Among these fibers, particularly, a polyvinyl alcohol fiber is further optimal.

As the polyvinyl alcohol fiber, there are a polyvinyl alcohol fiber produced by an aqueous wet spinning method which has been performed from old time, and a polyvinyl alcohol fiber of a high Young's modulus produced by a solvent wet cooling gel spinning method which has been newly developed. Among them, the polyvinyl alcohol fiber produced by a solvent wet cooling gel spinning method has a higher Young's modulus than that of the polyvinyl alcohol fiber produced by an aqueous wet spinning method which has previously been used, and has a higher breakage elongation of 4 to 15% than that of an inorganic fiber, therefore, fiber breakage occurs with difficulty even at pleats processing. In addition, since a wet heat shrinkage is as small as 1.2% or less, dimensional change of a nonwoven fabric sheet at drying heat treatment upon fixation of a fiber aggregate is small. Further, since a moisture absorption rate is low, the polyvinyl alcohol fiber undergoes influence of moisture with difficulty, the polyvinyl alcohol fiber is a fiber which has small dimensional change of a filtering medium, and in which flame retardancy described later is easily obtained. Therefore, the polyvinyl alcohol fiber is an optimal fiber as a single fiber constituting the nonwoven fabric sheet.

In addition, although the polyvinyl alcohol fiber is not used expecting stiffness, when it is used as a fiber bridging an active carbon fiber between fibers, it can contribute to improvement in deodorizing performance, being preferable.

Further, when a polypropylene fiber is used, since after an oil and an ion adhesion substance on a fiber surface are washed, it can be electret-processed by a corona discharge method or a hydrocharge method, a high collecting filtering medium can be obtained.

Then, fixation of the nonwoven fabric sheet between single fibers will be described. As a method of fixing the sheet between single fibers, a method of making a fiber aggregate constituting a nonwoven fabric contain a resin, and drying to fix this can be preferably performed. When such a resin itself is elongation-deformed, since it becomes difficult to obtain stiffness as a filtering medium, it is preferable to use a resin having small elongation. That is; a method of making a fiber aggregate contain a resin having a glass transition point temperature Tg of 30° C. or higher, preferably 35° C. or higher, more preferably 40° C. or higher, further preferably 50° C. or higher, and drying and heat-treating this to perform fixation between fibers is preferable. When a glass transition point temperature is higher than 80° C., since a film is not sufficiently made at drying at around 110° C., cracks are generated, or a disorder such as cracking occurs when an air pressure is applied in the state where exposed under the atmosphere at −40° C., therefore, a preferable range of Tg is a range of 30 to 80° C.

In addition, when a resin having relatively high Tg is used, the resin becomes hard even at a normal temperature, tensile elongation as the nonwoven fabric sheet is reduced, and approaches to tensile elongation of a single fiber used. For this reason, when the nonwoven fabric sheet fixed between fibers is pulled, a stress is applied to both of the resin and the fiber simultaneously, and a tensile strength in conformity with a Young's modulus of a fiber used is generated. For this reason, a nonwoven fabric sheet having small elongation, which is not deformed even with an air pressure, is easily obtained. In addition, since a resin is softened little even when a filter unit is used under the atmosphere of a high temperature, reduction in stiffness of the nonwoven fabric sheet is small, and the effect causing change in a pressure drop with difficulty is obtained.

As a resin which can exert such an effect, for example, an acrylic acid ester resin, a styrene/acryl resin, an epoxy resin, and vinylidene chloride can be suitably used. Among them, since the styrene/acryl resin has high stiffness, and has good adherability with a fiber, a force of fixing fibers become high, being suitable.

In addition, when a tough resin having a high hot water strength such as a urethane resin is used together with the aforementioned hard resin, since a tensile strength at heat drying by applying a gas adsorbing substance becomes high, occurrence of sheet breakage can be prevented.

It is preferable that the nonwoven fabric sheet fixed between single fibers thus has an apparent density in a range of 0.05 to 0.17 g/cm³. In order to retain an air permeation degree, deodorizing property and a dust retaining space of a filtering medium with a gas adhering substance adhered thereto, it is necessary that an apparent density as the filtering medium is 0.3 g/cm³ or less. For example, in the case of 0.35 g/cm³, a flow rate of the air flowing between a gas adhering substance is increased, and the deodorizing efficiency is reduced. In addition, since a flow rate is high, clogging is also rapid, and reduction in a life cannot be avoided. For this reason, an apparent density of such a nonwoven fabric sheet is 0.17 g/cm³ or less. On the other hand, when an apparent density of such a nonwoven fabric sheet is less than 0.05 g/cm³, a skeleton structure becomes weak, and it is difficult to attain a specific strength of 150 N·cm/g or more. For this reason, it is preferable that an apparent density of the nonwoven fabric sheet is in a range of 0.07 to 0.15 g/cm³. In addition, for the same reason, it is good that an apparent density of the filtering medium is 0.1 to 0.3 g/cm³. Preferably, the apparent density is suitably 0.1 to 0.25 g/cm³.

As a process for producing the foregoing nonwoven fabric sheet, a spunbond nonwoven fabric, a thermal bond nonwoven fabric, a wet sheet making method, and an air laid system can be exemplified. Among them, it is best that a nonwoven fabric sheet used in one embodiment of the present invention is obtained by impregnating an emulsion-based resin into a fiber aggregate obtained by wet-making a short non-crimped single fiber having a fiber length of a few mm to 25 mm, followed by drying, or is obtained by thermal bonding. The reason why a wet sheet making method is a best process for attaining certain embodiments of the present invention will be described in detail below.

A nonwoven fabric obtained by a dry chemical bonding process or a thermal bonding process essentially using crimped single fibers is obtained by passing a fiber through a carding machine into a fiber web, and fixing between fibers by resin processing or thermal adhesion. A nonwoven fabric structure becomes a structure in which loosing property in the three dimensional state remains, since the single fiber used is originally provided with three-dimensional crimping and, when fixed between fibers with a resin, the nonwoven fabric easily becomes thick. As a result, when an external force is applied, fiber entanglement is loosened from a potion where loosing property remains, and since elongation is caused preceding a deformation resistance strength, structure pressure drop is easily generated.

The spunbond nonwoven fabric is a high strength nonwoven fabric which is a long fiber having no crimp, but in order to impart a tensile strength, it is necessary that a fiber density is increased, and the fiber is thermally adhered between fibers. As a result, since a gap amount is reduced, when a deodorizing agent is adhered, a ratio of adhesion to a surface becomes higher than a ratio of adhesion to the interior, generating surface choking. In addition, since a deodorizing agent which has entered the interior of a nonwoven fabric similarly chokes a space between fibers, only a filtering medium having a low air permeation degree is obtained. Therefore, the spunbond nonwoven is not preferable.

On the other hand, since a wet sheet making method or dry air rate method nonwoven fabric sheet which can arbitrarily mix thick fibers and thin fibers with a short single fiber having a fiber length of a few mm to 25 mm has a planar fiber aggregate, orienting property of each of single fibers is one-dimensionally, and the sheet is in the state where there is no loosing property. This nonwoven fabric sheet fixed between single fibers of the fiber aggregate is preferable. Because loosing property generated accompanying with deformation of a fiber alone is small when an external force is applied, and a tensile resisting force corresponding to single fiber physical properties is generated immediately. Herein, a wet sheet making method is a method of making fibers dispersed in water into a sheet with a net, and the air laid method is a method of making fibers dispersed in the air into a sheet with a net. Based on the above reasons, in an embodiment of the present invention, it is preferable to produce a nonwoven fabric sheet by a wet sheet making method. Inter alia, as the wet sheet making method, there are cylinder system and inclined wire system, and since in the inclined wire system, after water with fibers dispersed therein is scooped up with a net to accumulate fibers on a net surface, and a binder solution can be impregnated, and dried, even when a fiber length to be scooped has a width, and a fiber is a long short fiber exceeding 10 mm, a sheet can be made. For this reason, since a nonwoven fabric sheet having little deformation elongation and high stiffness is easily obtained, this is an optimal process.

In addition, a wet sheet making method is an optimal process because a plurality of fiber groups having different fiber properties can be arbitrarily mixed (use of fibers having different Young's moduli, fibers having different diameters, fibers having different materials, thermal fusing fiber), resins having different Tg can be used, thus, fibers can be widely selected, and arbitrarily incorporated, and uniformity of a weight is excellent. In addition, it is also possible to make a fiber length great (e.g. 10 mm or more), this is very suitable in that uniformity of a weight becomes high, that is, a weight variation rate becomes small.

The merit of a uniform weight is that since a distance between fibers is compartmentalized at an equal interval, variation in a flow rate of the air flowing between fibers becomes small. As a result, when a deodorizing agent is adhered to a fiber surface, a deodorization rate variation becomes small, and a high deodorization rate can be obtained.

For example, a weight variation rate of a filtering medium of a pseudo-filtering medium using a dry chemical bond nonwoven fabric (weight 64 g/m²; crimped polyester fiber, single fiber fineness 10 dtex and 7 dtex, fiber incorporation ratio 50:50, weight 35 g/m², binder adhesion rate 25%, gas adsorbing substance adhesion amount 29 g/m² (particulate active carbon having average particle diameter of 24 μm, 20 g/m², adipic acid dihydrazide 5 g/m², binder 4 g/m²), thickness 0.25 mm), is high as 63%, and an adhesion rate of acetaldehyde is 34% and, on the other hand, a weight variation rate of a filtering medium having a thickness of 0.35 mm produced by a wet sheet making method (weight 64 g/m²; polyvinyl alcohol fiber having a length of 10 mm, single fiber fineness 10 dtex and 7 dtex, fiber incorporation ratio 50:50, weight 35 g/m², binder adhesion rate 25%, gas adsorbing substance adhesion amount 29 g/m² (particulate active carbon having average particle diameter of 24 μm, 20 g/m², adipic acid dihydrazide 5 g/m², binder 4 g/m²) is as small as 22%, and an adhesion rate of acetaldehyde is as very high as 70%. Thus, a weight variation rate influences on gas adsorbing performance, a weight variation rate of a filtering medium depends mainly on a weight variation rate of a nonwoven fabric sheet, and when a weight variation rate, that is, a distance between fibers becomes uniform, a flow rate of a gas is uniformized, and a distance that a gas component moves until it is adsorbed onto an adsorbent is shortened. As a result, a deodorization rate is dramatically increased. A smaller weight variation rate of a filtering medium is better, and 25% or less is preferable. More suitably, the weight variation rate is 20% or less, optimally, it is 15% or less.

In addition, in order to increase a deodorization rate, it is also preferable to jointly use fine fibers, and finely compartmentalize between fibers. However, when compartmentalize between fibers finely, clogging with a dust becomes vigorous, and a life is easily shortened. Then, as strategy for realizing both of clogging prevention and deodorization rate improvement, it is preferable that an upstream side of the air flow is a rough structure, and a downstream side is a compact structure. By doing such this, it becomes possible to attain both of slowing of dust clogging and improvement in a deodorization rate.

In order to form a compact structure on a downstream side, it is preferable to compartmentalize a space finely using a fine fiber. Specifically, for example, an upstream side becoming a rough layer is constructed of thick fibers of 10 dtex and 7 dtex, and a downstream side becoming a compact layer is constructed by mixing a 1 to 4 dtex fiber with thick fibers of 10 dtex and 7 dtex. By such a formation, in a compact layer, thick fibers function as a support forming a gap, and a fine fiber functions as a fiber for finely and narrowly compartmentalizing a space, a deodorization rate of a gas adsorbing substance is dramatically increased, and by collection of a large dust by a compact layer on an upper side, it becomes possible to attain prolongation of a life, and impartation of stiffness that does not excessively generate structure pressure drop.

As a process for producing a nonwoven fabric sheet of such a rough and fine structure, in addition to lamination of a plurality of layers of a nonwoven fabric, there are a method of continuously making a multilayered sheet in a sheet making step, and a method of making a sheet using a difference in a specific gravity of a fiber.

In addition, as a method of forming a rough and fine structure by mixing a stiff thick fiber and a relatively soft thin fiber and, simultaneously, making a sheet, for example, making of a sheet having a fiber construction of polyester and polyvinyl alcohol by mixing a thick stiff fiber having a fineness of 10 dtex of more and a Young's modulus of 180 cN/dtex and a thin soft fiber having a fineness of 5 dtex or less and a Young's modulus of 90 cN/dtex or less can be exemplified. By doing this, a thick fiber having a high Young's modulus stands in the state where it is stuck in a sheet making net, and a rough surface of a standing shape along a texture of a net is formed, and a gradually thicker fiber and a soft fiber are deposited and laminated thereon, thereby, an intermediate compact to compact layer can be formed.

A thickness of a nonwoven fabric sheet is preferably 0.8 mm or less, more preferably 0.70 mm or less, further preferably 0.6 mm or less, most preferably 0.55 mm or less. By adopting 0.8 mm or less, structure pressure drop can be suppressed low. On the other hand, since when a nonwoven fabric sheet is too thin, an amount of a space in which a dust can be retained becomes small, and a life is shortened, 0.3 mm or more is preferable.

Then, a gas adsorbing substance which is adhered to a nonwoven fabric sheet is described.

As a gas adsorbing substance used herein, a porous material or a deodorant and deodorizing compound which can physically adsorb and odor component can be adhered to a nonwoven fabric alone or in combination of them.

The porous material is not particularly limited, but active carbon, an active carbon fiber, natural and synthetic zeolite, active alumina, activated clay, sepiolite, metal oxide, catalyst-adhered porous material, silica, and silica-metal oxide can be widely used. Among them, active carbon, natural and synthetic zeolite, sepiolite, metal oxide, and porous silica can be suitably used because they are suitable for adsorbing a tobacco odor, stercus odor, and a kitchen odor.

Among them, active carbon is preferable because it can adsorb a variety of gas components. In a filter for an air cleaner, a collected tobacco odor is eliminated, generating an odor generation trouble, and an odor of a used active carbon itself becomes a problem in many cases. As strategy for this, it was found out that it is effective to remove an odor generating component (which is thought to be a water-soluble or alkali component in purities) contained in active carbon itself, and adjust a pH. As a removal method, it is effective to wash active carbon with water, or an acid such as hydrochloric acid and sulfuric acid. In addition, as active carbon, not pitch-based bat coconut shell active carbon is good, and active carbon activated with steam has smaller material odor, and has higher treatment effect than chloride-activated carbon, being optimal. For adhesion to a nonwoven fabric, active carbon for which a pH has been adjusted by washing with water or washing with an acid such as hydrochloric acid and sulfuric acid is adhered to a fiber surface using a binder, and a pH of a filtering medium is adjusted to 3 to 8, preferably 4.5 to 7.5, further preferably 5 to 7. A filtering medium for which a pH has been adjusted thus, weakens a material odor intensity of active carbon, and improve a rate of deodorizing acetaldehyde contained in a tobacco, thereby, a tobacco odor-generating trouble can be alleviated.

In addition, when a dihydrazide drug is mixed, and adhesion is performed, a rate of deodorizing acetaldehyde having a low threshold is further enhanced, on the other hand, a rate of deodorizing easily eliminated toluene or ammonia can be reduced, and an adsorption amount can be decreased, therefore, an odor generation trouble can be alleviated.

It is also preferable that a chemical having reactivity with a particular gas component is adhered to a porous material. As such a chemical, for example, there are potassium carbonate, and sodium bicarbonate exhibiting reactivity with an acidic gas component, and there are dihydrazide-based chemical and ethyleneureas for aldehydes.

Examples of a porous material to which such a chemical is adhered, for removing aldehydes, include active carbon and porous silica to which a dihydrazide compound such as adipic acid dihydrazide, and dodecanedioic acid dihydrazide, or a chemical such as p-aminobenzenesulfonic acid, and ethyleneurea-based condensate among primary to tertiary amine compounds is adhered. Among them, particularly, when any of adipic acid dihydrazine, dodecanedioic acid dihydrazide, or p-aminobenzenesulfonic acid is adhered to washed coconut shell active carbon, high aldehyde deodorizing property is obtained, being suitable. In this respect, such a chemicals may be arranged so as to adhere to a nonwoven fabric sheet using a binder after adhesion of chemicals to a porous material in advance, or chemicals to be adhered, a porous material and a binder may be prepared in the same bath, for adhesion. A preferable method is a method performing in the same bath, in which a large amount of chemicals can be adhered.

In addition, although not a porous material, photocatalyst such as metal oxide, iron ascorbic acid having a catalytic function, phthalocyanine derivatives of metals such as cobalt and manganese, and titanium oxide, plant extraction components such as catechin, flavonoid and the like having deodorization activity, and deodorization/deodorizing compounds such as ion-exchange resins can be also used as the gas adsorbing substance. Particularly, combining zinc oxide and sodium bicarbonate or potassium carbonate is preferable among combinations of zinc oxide and basic chemicals, because high removing performance as a fatty acid removing agent can be sought by this combining.

In this respect, when used in a filtering medium to be washing-regenerated, it is preferable to basically use a porous material with a non-water-soluble chemical adhered thereto, or a porous material with no chemical adhered thereto, as a gas adsorbing substance. For example, when active carbon with water-hardly soluble dodecanedioic acid dihydrazide as an acetaldehyde adsorbing substance adhered thereto is used, a rate of retaining an aldehyde removal rate after washing becomes higher than the case using active carbon with highly water-soluble adipic acid dihydrazide adhered thereto, and it is possible to maintain a high deodorization rate even after washing.

When the gas adsorbing substance is used at an adhesion amount which is a ratio of 200% or less relative to a mass of a nonwoven fabric sheet, excessive clogging of the nonwoven fabric sheet can be prevented.

The gas adsorbing substance is a fine particle having an average of a primary particle diameter of 40 μm or less. When an average particle diameter is more than 40 μm, since a force for adhesion with the nonwoven fabric sheet is reduced, particle dropping off occurs due to rubbing with a machine at a pleats processing step, and processibility is not obtained. In addition, since when coated by impregnation processing or coating processing, permeation and adhesion do not occur uniformly into the interior of the nonwoven fabric sheet, being not preferable. For this reason, a suitable average particle diameter is 35 μm or less, more suitably 30 μm or less, most suitably 25 μm or less. On the other hand, when an average particle diameter is less than 1 μm, uniform adhesion into the interior of the nonwoven fabric sheet occurs, being preferable. However, since particles are easily buried in a binder, and a gap between particles disappears, deodorizing property is easily reduced. For this reason, when used by mixing large particles, a space through which the air passes is maintained at a particle overlapping part, and a deodorizing rage can be enhanced. For this reason, when a nano-particle of 1 μm or less is used, it is better that larger particles than the nano-particle are mixed to maintain bulkiness.

As a binder used for adhering the gas adsorbing substance to the nonwoven fabric sheet, it is preferable to select and use a binder having low reactivity with a chemical to be adhered, from an acrylic acid ester resin, a styrene-acrylic acid ester resin, a urethane resin, a silicon resin, and a water-soluble resin. Among them, when washing regeneration is dynamically performed, a water-soluble resin is preferable. That is, when the gas adsorbing substance is adhered to the nonwoven fabric sheet with a water-soluble resin, although it is also possible to perform regeneration by a method of immersing a used filter with a gas adhered thereto in water to wash off an adsorbed gas component, the filter can be regenerated as a filter having initial high deodorizing property by immersing the filter in water to dissolve a water-soluble resin, thereby, removing the gas adsorbing substance, and coating, drying and adhering a fresh gas adsorbing substance again, being preferable. In addition, the recovered gas adsorbing substance can be regenerated and used by removing foreign matters. A resin suitable for such a regeneration method is water-soluble and, for example, methylcellulose-based resin, starch, polyvinyl alcohol, poly (sodium acrylate), and sodium alginate can be used. Particularly, among them, carboxymethylcellulose is preferable because it does not choke a whole of a porous material.

It is suitable that the binder is used in a range of 5 to 30% by mass of the gas adsorbing substance.

Further, it is also preferable to arrange a plurality of gas adsorbing substances having different deodorizing functions in layers in a filtering medium thickness direction, as the gas adsorbing substance. Herein, an embodiment in which a plurality of gas adsorbing substances are imparted to the nonwoven fabric sheet having a rough and fine structure will be described one example. For example, as the gas adsorbing substance to be adhered downstream of an air flow, a porous material: silica particles (particle diameter 10 μm), and a chemical to be adhered: adipic acid dihydrazide are prepared, and 15 g/m² coating is performed by a coating method using a urethane resin as the binder. In addition, as the gas adsorbing substance on an upstream side, a porous body: coconut shell active carbon (particle diameter 24 μm), and a chemical to be adhered: potassium carbonate are prepared, and 15 g/m² is applied to the nonwoven fabric sheet to which the gas adsorbing substance has been already applied, using a silicone resin as the binder, by a coating method. As a result, a filtering medium consisting of one nonwoven fabric sheet, in which a downstream side functions as an acetaldehyde deodorizing layer, and upstream side functions as a fatty acid deodorizing layer and a multiple component deodorizing layer, can be obtained.

In addition, as a method of preventing clogging of a compact layer as a lower layer to improve deodorizing property, for example, it is preferable to apply fine diameter particles having an average particle diameter of 5 μm or less on a compact layer on a downstream side, and apply larger particles than those of a dense layer, on a rough layer on an upstream side.

Further, it is also possible that a capturing efficiency of the nonwoven fabric sheet having a rough and fine structure is 5 to 50% for 0.3 to 0.5 μm particles, and the gas adsorbing substance is applied only to a rough part. When a capturing efficiency of the rough and fine structure is around 5 to 50% for 0.3 to 0.5 μm particles, since a fineness is greater, and the fabric is bulky as compared with a melt-blown nonwoven fabric, the structure is clogged with difficulty, stain of a tobacco or the like, and odor removal are good, and washing regeneration ability becomes excellent. However, when a capturing efficiency becomes around 20 to 50%, since a distance between fibers becomes small, even when a smaller amount of a gas adsorbing substance is applied, clogging is vigorous, and an airflow resistance is increased above an acceptable value, in some cases. Therefore, in order to avoid this, and realize deodorizing property and high capturing property, it is also effective to apply the gas adsorbing substance only on a rough layer.

Alternatively, it is also preferable to apply a plurality of gas adsorbents having different gas adsorbing properties. For example, when coconut shell active carbon is coated by an immersion method firstly, and porous silica with adipic acid dihydrazide adhered thereto is overlappingly coated secondary, it is possible to adsorb fatty acid and an organic gas such as acetic acid and formic acid with active carbon, and adsorb aldehyde with porous silica with adipic acid dihydrazide adhered thereto.

In addition, a gas adsorbent is not limited to two layers, but a plurality of layers may be provided. Alternatively, it is also possible to mix and coat porous materials having different functions. By doing this, it also becomes possible to improve an insufficient deodorizing rate of a specified gas, and deodorize simultaneously an acidic gas and a basic gas having different adsorbing properties. Alternatively, a method of coating a large amount only on a rough surface, and not coating on a more compact dense surface, thus, improving deodorizing property and high capturing property. Any of them can be subjected to pleats processing for adhesion to a thin hard nonwoven fabric sheet layer according to one embodiment of the present invention, and it is possible to form a mini-pleats-type filter unit.

In one embodiment of the present invention, the nonwoven fabric sheet contains flame retardants. Examples of the flame retardant include halogen-based flame retardants such as a bromine-based flame retardant and a chlorine-based flame retardant, phosphorus-based flame retardants, guanidine-based flame retardants, melamine-based flame retardants, and inorganic-based flame retardants. Among them, a non-halogen-based flame retardant and a bromine-based flame retardant in conformity with RoHS regulation are preferable in that a harmful substance is not generated at incineration.

Further, among the non-halogen-based flame retardants, a sulfamine-based flame retardant, a phosphorus-based flame retardant such as phosphoric acid ester amide, ammonium phosphate, guanidine phosphate, melamine phosphate and the like, and melamine sulfate have the high effect of promoting carbonization when a polyvinyl alcohol component and a cellulose component such as polyvinyl alcohol and a pulp are burnt, and have the high effect of promoting carbonization even when a type of a fiber which is melted at burning of a polyester fiber is mixed, and preventing burning extension, being suitable.

It is suitable that the flame retardant is water-soluble. However, a flame retardant which becomes particulate at a room temperature is optimal because when blended, a specific strength is not reduced.

In addition, in one embodiment of the present invention, the nonwoven fabric sheet may have imparted function by imparting a water repellent, a perfume, an antibacterial agent, an anti-viral agent, an anti-allergen agent or the like.

In the present invention according to certain aspects, it is possible to realize high dust collection by laminating an electret nonwoven fabric on the aforementioned filtering medium by the known technique to obtain an integrated high dust collecting filtering medium. Integration may be adhesion with a low melting point powder or a fiber, or adhesion with ultrasound. As used herein, "integration" refers to the state where the filtering medium is seen as a member constituting a filter unit and, in that case, the unit cannot be separated as far as it is not damaged.

A process for production of, and performance of an electret nonwoven fabric are not particularly limited, but a melt-blown nonwoven fabric is a suitable material in that it is thin, and highly collecting. Particularly, a melt-blown nonwoven fabric having a capturing efficiency of 95% or more is suitable for a home air cleaner.

The aforementioned filtering medium and high dust collecting filtering medium are formed into a desired shape, and formed into a filter unit, and washing regeneration can be performed by washing out an odor substance adsorbed onto the filtering medium. The reason is as follows: since the filtering medium is such that a gas adsorbing substances is adhered to a nonwoven fabric sheet which is hard, and is deformed with difficulty as described above, the sheet is deformed with difficulty even when it is washed. In addition, when the filtering medium is pleats-processed to form a unit, since a washing solution easily enters the interior of a unit, a stain is removed well, and the air is easily flown therein, the effect that a drying time is short is obtained. Further, since a high dust collecting filtering medium in which an electret nonwoven fabric is laminated and integrated is such that a dust collecting filtering medium and a deodorizing filtering medium are integrated, a labor that a dust collecting portion and a deodorizing portion have previously been washed separately is overcome by convenience of washing together.

In addition, in the high dust collecting filtering material in which an electret nonwoven fabric is laminated, a collecting efficiency of the electret nonwoven fabric is easily reduced by washing. An initial dust collecting efficiency of an air cleaner defined by the electric industry field is 70% or more, but in the high dust collecting filtering material in which an electret nonwoven fabric is laminated, since a charge of the electrets nonwoven fabric is lost by washing, a dust collecting efficiency is reduced to around 30%, in some cases. Then, in order to maintain a dust collecting efficiency of an air cleaner at 70% or more even after washing, it is preferable that the high dust collecting filtering material has a capturing efficiency for 0.3 to 0.5 μm particles in the state where the medium has no charge is 20% or more at a filtering medium penetrating air speed of 4.5 m/min.

Further, in the high dust collecting filtering material, leaving property of an adhered dust can be improved by making a fiber surface hydrophilic or water-repellent.

EXAMPLES

The present invention will be described more specifically below using Examples. Further, a method of assessing each property of a filtering medium in the present Examples will be described below.

<Fineness, Fiber Length and Construction Ratio of Single Yarn>

A nonwoven fabric sheet which is fixed between single fibers with a resin is immersed in a solution in which the resin is dissolved, to remove a resin matter, thereby, leaving only a fiber, a fiber length is measured with a caliper, and fibers are classified depending on a length. In addition, for each group having a different fiber length, a fiber width is measured with an electron microscope. Thereupon, at least 60 or more of fibers are measured, and single fiber constructions are classified into every group. Then, a constituent fiber is placed in a density gradient solution prepared by mixing carbon tetrachloride and water, a liquid density at which the fiber is not floated or not sunk is obtained, and this is defined as a fiber density. In addition, if a fiber is dissolved in a density gradient solution, another suitable organic solvent having a great specific gravity in which the fiber is not dissolved is selected.

A fineness of a single fiber is obtained, letting a mass of 1 g at a length of 10000 m to be 1 dtex, from a relationship between obtained density and fiber length of the single fiber.

Then, as a constituent ratio of a single fiber, a construction ratio for each group of a single fiber obtained above is converted into a construction ratio of a fineness and a fiber length, and a ratio occupied in a total fiber mass is calculated.

<Young's Modulus>

A Young's modulus is assessed according to JIS-L1013 (1999). An apparent Young's modulus is obtained from an initial tensile resistance degree, and this numerical value is defined as Young's modulus. In addition, since a fiber length is short as a few mm to a few tens mm, a tensile rate per minute is 60% of a fiber length, in addition, the assessment N number is 20, and an arithmetic mean of those 20 values is adopted as Young's modulus in embodiments of the present invention.

<Weight Variation Rate of Filtering Medium>

Twenty-five samples of 2 cm square are made from a sample of 10 cm square, and a weight of each of 25 samples is obtained. An average (A) and a standard deviation value (B) are obtained from 25 weight numerical values, and a weight variation rate is obtained from the following equation. Weight variation rate (%)=B×100/A If an assessment sample is high dust collecting filtering medium in which an electrets nonwoven fabric is laminated, an adhesive which connects the electret nonwoven fabric is dissolved, and the nonwoven fabric is peeled for measurement.

<Thickness>

A thickness is obtained at a measurement frequency of 3 places per 60 $cm^2$, a total 21 places, using SM114 manufactured by Techlock, and an arithmetic average is defined as thickness.

<Weight>

A sample is allowed to stand at room temperature of 24° C. 60% RH for 8 hours or longer, a weight of an assessment sample is obtained, its area is converted into a mass per 1 m$^2$, and a weight is obtained as a weight of each assessment sample. A sampling minimum area is 0.01 m$^2$, the number of sample to be assessed is 25, and an arithmetic average thereof is defined as weight.

<Apparent Density of Filtering Medium>

A thickness of a total of 21 places is obtained at a measurement density of one place per 100 cm$^2$ sample area using SM114 manufactured by Techlock, and an arithmetic average thereof is calculated. From the thickness and the weight of a filtering medium obtained by the above methods, an apparent density of a filtering medium is obtained the following equation.

Apparent density of filtering material (g/cm$^3$)=weight (g/cm$^2$)/thickness (cm)×6000

<Specific Strength of Filtering Medium>

A tensile strength is obtained according to JIS L1085 (1998), and a specific strength is obtained from the tensile strength. Specifically, first, a strength (N) generated at 1% elongation is obtained from a S-S curve obtained by assessing a filtering medium of a width of 50 mm with a constant rate tensile testing machine (Autograph, model AGS-J manufactured by SHIMADZU) at a length between chucks of 200 mm, and a tensile rate of 100 mm/min, the generated strength is divided by a cross-sectional area (filtering medium width 50 mm×filtering medium thickness) of a test piece to obtain a tensile strength (N/cm$^2$) at 1% elongation. Subsequently, the tensile strength (N/cm$^2$) is divided by an apparent density (g/cm$^3$) of a filtering medium obtained by the aforementioned method, to obtain a specific strength. In addition, a specific strength is an arithmetic average of values obtained by assessment of at least 5 or more sampling of a length of 200 mm in a pleats-processing direction (MD direction) of the filtering medium.

<Glass Transition Point Temperature of Resin Fixing Between Single Fibers>

A resin component is collected from a nonwoven fabric, and a glass transition point temperature is assessed by a DSC method (high sensitive differential thermal analysis). The assessment N number is 2, and an arithmetic average is defined as glass transition point temperature.

<Particle Diameter of Gas Adsorbing Substance>

A filtering medium having a weight of 0.1 g is immersed in 1 liter of a solvent which can dissolve a binder which binds a gas absorbing substance to separate only the gas adsorbing substance, 10 CC of a separated solution is filtered with a filter, this is dried, the gas adsorbing substance adhered to a filter surface is observed with an electron microscope, a longest portion of each particle is measured (N number is 100), and an arithmetic average thereof is obtained.

<Measurement of Gas Removal Rate>

An assessment sample is set in a testing machine according to JIS B9908 (2001) form 1 test method, the air in which acetaldehyde or acetic acid in place of an aerosol is adjusted to a gas concentration of 10 to 15 ppm is flown through the sample at an air rate of 0.2 m/s, a gas concentration in front of, and rear the assessment sample is measured with a gas meter Model 205 B-XLIA3N of THARMO SCIENTIFIC, and a removal rate (D) is obtained from the following equation.

Measurement is performed at an air volume expressed as a passing air rate of 0.2 m/s. In addition, at measurement beginning, a measurement three minutes after initiation of flow of the air is measured. In addition, as the diluting air to be supplied to the present measurement, the air which is adjusted to 23° C. 50% RH and from which a gas component has been removed in advance, is used.

Assessment N number is 2, and an arithmetic average is defined was gas removal rate.

$$D=(G_I-G_O/G_I)\times 100$$

$G_O$=gas concentration after passed through assessment sample (ppm)

$G_I$=gas concentration supplied to assessment sample (ppm)

<JEMA Deodorization Rate of Filter Unit>

An initial deodorization rate of ammonia, acetic acid, and acetaldehyde is obtained based on JEMA1467 specification.

<Measurement of Pressure Drop and Collecting Performance Filtering Medium and Electret Nonwoven Fabric>

An assessment sample is set in an assessment equipment according to JIS B9908 (2001) form 1 test method, the air is flown through the sample at a filtering medium penetration air rate of 4.5 m/min, and a filter unit initial pressure drop (ΔP2) is obtained. Then, the general external air is supplied from an upstream side, the number of particles in front of, and rear an assessment filter is measured using a particle counter, and a capturing efficiency is obtained from the following equation.

$$\eta=(1-(C_O/C_I))\times 100$$

$C_O$=number of particles of particle diameter of 0.3 to 0.5 μm after passed through assessment filter $C_I$=number of particles of particle diameter of 0.3 to 0.5 μm before passed through assessment filter In addition, the number of particles of a particle diameter of 0.3 to 0.5 μm means the number of particles contained in a measurement range of 0.3 to 0.5 μm as expressed by a particle diameter measurement range of the particle counter and, as the particles, the air dusts contained in the general external air are used.

A pressure drop is obtained by reading a difference pressure in front of and rear an assessment sample with a manometer.

<Measurement of Pressure Drop of Filter Unit and Performance of Collecting Particles Having Particle Diameter of 0.3 to 0.5 μm>

A filter unit is set in an assessment instrument according to JIS B9908 (2001) form 1 test method, the air is flown through the unit at a filtering medium penetration air rate of 3.5 m/min, and a filter unit initial pressure drop (ΔP2) is obtained. Then, the general external air is supplied from an upstream side, the particle number (atmospheric air dust) in front of, and rear an assessment filter is measured using a particle counter, and a capturing efficiency is obtained from the following equation.

$$\eta=(1-(C_O/C_I))\times 100$$

$C_O$=number of particles of particle diameter of 0.3 to 0.5 μm after passed through assessment filter $C_I$=number of particles of particle diameter of 0.3 to 0.5 μm before passed through assessment filter A pressure drop is obtained by reading a difference pressure in front of, and rear an assessment sample with a manometer.

<Method of Measuring Dust Retaining Volume of Filter Unit>

A filter unit is set in an assessment instrument according to JIS B9908 (2001) form 3 test method, the air is flown through the unit at a filtering medium penetration air rate of 3.5 m/min, and a filter unit initial pressure drop (ΔP2) is obtained. Then, until a time at which the pressure drop reaches a final pressure drop of 150 Pa, dust Class 15 described in JIS Z 8901

(1974) is supplied, and an amount of a dust collected with the filter unit is obtained from a change in a unit weight before and after a test.

<Method of Measuring pH of Filtering Medium>

A pH of a solution extracted from a deodorizing layer is measured with a pH measuring-meter "PH81" manufactured by Yokokawa Electric Corporation by a method according to JIS L1096 method.

<Liquid Formulation of Gas Adsorbing Substance>

Liquid formulation of a commonly used gas adsorbing substance (parts by mass) is summarized below.

A Liquid; active carbon 20 parts (average particle diameter 24 μm), adipic acid dihydrazide 7 parts, acrylic acid resin 10 parts (concentration 40%), thickener 2 parts, water 61 parts B Liquid; porous silica 20 parts (average particle diameter 5 μm), adipic acid dihydrazide 7 parts, acrylic acid resin 10 parts (concentration 40%), thickener 2 parts, water 61 parts C Liquid; active carbon 20 parts (average particle diameter 24 μm), zeolite 7 parts, acrylic acid resin 10 parts (concentration 40%), thickener 2 parts, water 61 parts D solution; zinc oxide 25 parts (average particle diameter 2 μm), sodium bicarbonate 7 parts, acrylic acid resin 5 parts (concentration 40%), thickener 2 parts, water 61 parts E Liquid; active carbon 23 parts (average particle diameter 24 μm), dodecanedioic acid dihydrazide 4 parts, acrylic acid resin 10 parts (concentration 40%), thickener 2 parts, water 61 parts F Liquid; active carbon 20 parts (average particle diameter 55 μm), adipic acid dihydrazide 7 parts, acrylic acid resin 10 parts (concentration 40%), thickener 2 parts, water 61 parts G Liquid; coconut shell active carbon pH 5.2 obtained by immersing 10 parts of active carbon having a particle diameter of 3000 μm in 100 parts of purified water, drying this, and grinding this into an average particle diameter of 24 μm, 20 parts, adipic acid dihydrazide 7 parts, acrylic acid resin 10 parts (concentration 40%), thickener 2 parts, water 61 parts Example 1

By a wet sheet making method of an inclination wire system, a fiber aggregate having a weight of 36.4 g/m² composed of a non-crimped polyvinyl alcohol fiber ((a) 32% by mass of Young's modulus 150 cN/dtex, fineness 7 dtex, fiber length 10 mm, (b) 29% by mass of Young's modulus 250 cN/dtex, fineness 17 dtex, fiber length 12 mm), a non-crimped polyester fiber ((a) 15% by mass of Young's modulus 65 cN/dtex, fineness 3 dtex, fiber length 10 mm, (b) 5% by mass of Young's modulus 65 cN/dtex, fineness 1.3 dtex, fiber length 5 mm), and a pulp (19% by mass) was prepared. Thereafter, the fiber aggregate was immersed in a resin liquid solid matter 30% liquid obtained by mixing a styrene acryl polymer (glass transition point temperature Tg 30° C., film making temperature 45° C.) and a urethane polymer at a ratio of 3:1 as expressed by a weight ratio, this is dry heating-treated to fix between single fibers, to make a nonwoven fabric sheet having a weight of 52 g/m², a thickness of 0.46 mm, an apparent density of 0.11 g/cm³, a pressure drop of 0.5 Pa, and a specific strength of 1020 N·cm/g.

In this nonwoven fabric sheet, a surface formed by direct contact with a net when fibers dispersed in water was scooped with the net was a rough surface (having high surface friction resistance value) where standing of fibers is remarkable due to sticking into the net and, on the other hand, an opposite surface was a compact surface (having low surface friction resistance value) in which standing of fibers was small. That is, the nonwoven fabric sheet had a rough and fine structure.

In addition, a urethane resin was blended into a resin for fixation between single fibers, the sheet could stand a sheet tensile strength under wet thermal condition at a step of impregnation and drying of a gas adsorbing substance to be performed at a post-step.

On this nonwoven fabric sheet was adhered a gas adsorbing substance of the A-liquid as a gas adsorbing substance at a solid matter of 32 g/m² by an impregnation drying method, to prepare a filtering medium having a weight of 84 g/m², a thickness of 0.46 mm, an apparent density of 0.183 g/cm³, a specific strength of 546 N·cm/g, a pressure drop of 0.8 Pa, a weight variation rate of 10%, an acetaldehyde deodorization rate of 70%, and an efficiency of collecting 0.3 to 0.5 μm particles of 5%. Further, an acetaldehyde removal rate of a nonwoven fabric sheet with no gas adsorbing substance coated thereon is 1% or less.

On this filtering medium was adhesion-integrated an electret nonwoven fabric A (propylene melt-blown nonwoven fabric having a weight of 20 g/m², an average fiber diameter of 2.4 μm, a pressure drop of 28 Pa, an efficiency of collecting 0.3μ to 0.5 μm particles η=95%, and a thickness of 0.12 mm), to prepare a high dust collecting filtering medium (pressure drop 28.9 Pa) having a thickness of 0.58 mm, which can also capture fine dusts.

This high dust collecting filtering medium was pleats-processed into a crest height of 35 mm, and this was accommodated in a frame having a filter size of a width 250 mm, a length 450 mm and a thickness of 37 mm, to obtain a filter unit for an air cleaner having a filtering medium area of 2.0 m².

Regarding this filter unit, unit pressure drop was measured at an air volume of 7 m³/min and, as a result, the unit was a low pressure drop unit having little occurrence of a structure pressure drop of 49 Pa (structure pressure drop 26.5 Pa). In addition, an efficiency of collecting 0.3 to 0.5 μm particles was 98.2%. A JEMA initial deodorization rate in this filter unit was 93.8% for ammonia, 75.4% for acetaldehyde, and 90.3% for acetic acid, and high deodorizing property was shown. It was confirmed that the unit is a high collecting dust collecting deodorizing filter unit.

Example 2

By a wet sheet making method of an inclination wire system, a fiber aggregate of a weight of 36.4 g/m² composed of a non-crimped polyvinyl alcohol fiber (81% by weight of Young's modulus 150 cN/dtex, fineness 7 dtex, fiber length 10 mm), and a pulp (19% by mass) was prepared. Thereafter, the fiber aggregate was immersed in a resin liquid solid matter 30% liquid obtained by mixing a styrene acryl polymer (glass transition point temperature Tg 30° C., film making temperature)45° and a urethane polymer at a ratio of 3:1 as expressed by a weight ratio, and this was dry heat-treated to fix between single fibers to prepare a nonwoven fabric sheet having a weight of 52 g/m², a thickness of 0.48 mm, an apparent density of 0.11 g/cm³, a pressure drop of 0.3 Pa, and a specific strength of 909 N·cm/g. Since this nonwoven fabric sheet had only one kind of a non-crimped polyvinyl alcohol fiber, a rough and fine structure was not recognized.

To this nonwoven fabric sheet was adhered a gas adsorbing substance of the A-liquid as a gas adsorbing substance at a solid matter of 32 g/m² by an impregnation drying method, to prepare a filtering medium having a weight of 84 g/m², a thickness of 0.46 mm, an apparent density of 0.175 g/cm³, a specific strength of 543 N·cm/g, a pressure drop of 0.5 Pa, a weight variation rate of 11%, an acetaldehyde deodorization rate of 61%, and an efficiency of collecting 0.3 to 0.5 μm particles of 5%. The filtering medium was a filtering medium having no rough and fine structure, but a high acetaldehyde deodorization rate could be confirmed.

Example 3

According to the same manner as that of Example 1 except that the gas adsorbing substance was changed to the E-liquid containing water-hardly soluble dodecanedioic dihydrazide, a filtering medium was prepared, washing with water and drying were performed two times, and an acetaldehyde removal rate was assessed. As a result, although an acetaldehyde removal rate was reduced to an initial value of 65%, after washing with water one time 62%, after washing with water two times 58%, a high removal rate could be confirmed. Since dodecanedioic acid dihydrazide is water-hardly soluble, a high removal rate could be confirmed even after washing with water.

Example 4

By a wet sheet making method of a inclination wire system, a fiber aggregate having a weight of 24.5 g/m$^2$ composed of a non-crimped polyvinyl alcohol fiber ((a) 51.4% by mass of Young's modulus 250 cN/dtex, fineness 17 dtex, fiber length 12 mm, (b) 19.2% by mass of Young's modulus 180 cN/dtex, fineness 7 dtex, fiber length 10 mm), a non-crimped polyester fiber (10% by mass of Young's modulus 95 cN/dtex, fineness 3 dtex, fiber length 10 mm), and a pulp (19.4% by mass) was prepared. Thereafter, the fiber aggregate was immersed in a resin liquid solid matter 30% liquid obtained by mixing a styrene acryl polymer (glass transition point temperature Tg 30° C., film making temperature 45° C.) and a urethane polymer at a ratio of 3:1 as expressed by a weight ratio, this is dry heating-treated to fix between single fibers, to make a nonwoven fabric sheet having a weight of 35 g/m$^2$, a thickness of 0.37 mm, an apparent density of 0.09 g/cm$^3$, and a specific strength of 767 N·cm/g. In this nonwoven fabric sheet, a surface formed by direct contact with a net when fibers dispersed in water was scooped with the net was a rough surface (having high surface friction resistance value) where standing of fibers is remarkable due to sticking into the net and, on the other hand, an opposite surface was a compact surface (having low surface friction resistance value) in which standing of fibers was small. That is, the nonwoven fabric sheet had a rough and fine structure.

To this nonwoven fabric sheet was adhered a gas adsorbing substance of the B-liquid containing porous silica as a gas adsorbing substance, and adipic acid dihydrazide at a solid matter of 32 g/m$^2$ by an impregnation drying method, to prepare a filtering medium having a weight of 67 g/m$^2$, a thickness of 0.37 mm, an apparent density of 0.181 g/cm$^3$, a specific strength of 370 N·cm/g, a pressure drop of 0.63 Pa, a weight variation rate of 8%, and an acetaldehyde deodorization rate of 79%.

On a compact surface of this filtering medium was adhesion-integrated an electret nonwoven fabric B (polypropylene melt-blown nonwoven fabric of weight 30 g/m$^2$, average fiber diameter 1.2 µm, a pressure drop 55 Pa, efficiency of capturing 0.3 to 0.5 µm particles η=99.992, thickness 0.18 mm) to prepare a high dust collecting filtering material (pressure drop 55.7 Pa) of a thickness of 0.55 mm, which also capture fine dusts.

This high dust collecting filtering medium was pleats-processed into a crest height of 35 mm, and accommodated in a frame having a filter size of a width of 250 mm, a length of 450 mm, and a thickness of 37 mm to obtain a filter unit having a filtering medium area of 2.0 m$^2$.

Regarding this filter unit, a unit pressure drop was measured at an air volume of 7 m$^3$/min and, as a result, the unit was a low pressure drop unit having little occurrence of structure pressure drop of 68.1 Pa (structure pressure drop 24.8 Pa), and HEPA performance such as an efficiency of collecting 0.3 to 0.5 µm particles of 99.987% could be confirmed.

A gas removal efficiency was obtained based on JEMA1467 specification and, as a result, the gas removal efficiency was 96% for acetaldehyde, 73% for ammonium, and 83% for acetic acid. By combining porous silica with adipic acid dihydrazide, a low pressure drop high dust collecting deodorizing HEPA filter having a high threshold and a high particularly excellent high acetaldehyde gas removal rate could be confirmed.

Example 5

To the nonwoven fabric sheet prepared in Example 4 was adhered a gas adsorbing substance (chemical non-adhered) of the C-liquid containing active carbon and zeolite as a gas adsorbing substance at a solid matter of 32 g/m$^2$ by an impregnation drying method to prepare a filtering medium having a weight of 67 g/m$^2$, a thickness of 0.37 mm, an apparent density of 0.181 g/cm$^3$, a specific strength of 370 N·cm/g, a pressure drop of 0.7 Pa, a weight variation rate of 8%, and an acetaldehyde deodorization rate of 40%.

On this filtering medium was adhesion-integrated an electret nonwoven fabric A (polypropylene melt-blown nonwoven fabric of weight 20 g/m$^2$, average fiber diameter 2.4 µm, pressure drop 28 Pa, efficiency of capturing 0.3 to 0.5 µm particles η=95%, thickness 0.12 mm) to prepare a high dust collecting filtering material (pressure drop 28.6 Pa) of a thickness of 0.49 mm, which also capture fine dusts.

This high dust collecting filtering medium was pleats-processed into a crest height of 35 mm, and accommodated in a frame having a filter size of a width of 250 mm, a length of 225 mm, and a thickness of 37 mm to obtain a filter unit having a filtering medium area of 1.0 m$^2$. In addition, upon conversion into a unit, a beads processing at an interval of 2 inch was performed on both sides of the filtering medium, between filtering media.

Regarding this filter unit, unit a pressure drop was measured at an air volume of 3.5 m$^3$/min and, as a result, the unit was a low pressure drop unit having little occurrence of a structure pressure drop of 50.4 Pa (structure pressure drop 28 Pa), and HEPA performance such as an efficiency of collecting 0.3 to 0.5 µm particles of 96% could be confirmed.

A gas removal efficiency was obtained based on JEMA1467 specification and, as a result, the gas removal efficiency was 46% for acetaldehyde, 80% for ammonium, and 78% for acetic acid. A low pressure drop high dust collecting filter unit having such a gas removal rate could be confirmed although an acetaldehyde gas removal rate was low.

Subsequently, a smoke of 500 tobaccos was loaded on this unit to make the unit strongly emit an odor, and this was washed using a home detergent, and dried. In the filter after washing, an odor of a tobacco adhered to the filter could be considerably reduced. In addition, a gas removal efficiency was obtained based on JEMA1467 specification and, as a result, the gas removal efficiency was 42% for acetaldehyde, 73% for ammonia, and 73% for acetic acid. Deodorizing performance near initial values was exerted, and it could be confirmed that reuse is possible.

Example 6

A nonwoven fabric sheet of a bilayer structure was cm/g, prepared. An upstream side was the fiber aggregate (weight 24.5 g/m²) used in Example 4, and a downstream side was a fiber aggregate of a weight of 13 g/m² compose of a non-crimped polyvinyl alcohol fiber (45% by mass of Young's modulus 320 cN/dtex, fineness 7 dtex, fiber length 10 mm), and a non-crimped polyester fiber ((a) 10% by mass of Young's modulus 65 cN/dtex, fineness 1.3 dtex, fiber length 5 mm, (b) 35% by mass of Young's modulus 95 cN/dtex, fineness 3 dtex, fiber length 10 mm, (c) 10% by mass of Young's modulus 95 cN/dtex, fineness 1.3 dtex, fiber length 5 mm), and a fiber aggregate of a bilayer structure having a weight of 37.5 g/m² was prepared by a wet sheet making method. Thereafter, the fiber aggregate was immersed in a resin liquid solid matter 25% liquid obtained by mixing a styrene acryl polymer (glass transition point temperature Tg 30° C., film making temperature 45° C.) and a urethane polymer at a ratio of 3:1 as expressed by a weight ratio, and this was dry heat-treated to fix between single fibers to prepare a nonwoven fabric sheet having a weight of 49.4 g/m², a thickness of 0.45 mm, an apparent density of 0.11 g/cm³, a specific strength of 927 N·cm/g, a pressure drop of 1.2 Pa, and an efficiency of capturing 0.3 to 0.5 μm particles of 15%.

To an upstream side of this nonwoven fabric sheet was adhered a glass adsorbing substance B-liquid containing porous silica and adipic acid dihydrazide at a solid matter of 32 g/m² by a coating method. Then, to a downstream side layer was adhered a gas adsorbing substance D-liquid containing zinc oxide and sodium bicarbonate expecting removal of an acetic acid gas at a solid matter of 20 g/m² by a coating method to obtain a filtering medium to which a plurality of gas adsorbing substances are applied in layers, having a total weight of 101.5 g/m², a thickness of 0.44 mm, an apparent density of 0.230 g/cm³, a specific strength of 434 N·cm/g, a pressure drop of 2.3 Pa, a weight variation rate of 7%, an acetaldehyde deodorization rate of 81%, and an acetic acid gas removal rate of 91%, and having a high acetic acid gas removal rate which was particularly obtained as a result of small division of a distance between fibers of the downstream layer.

Then, this filtering medium was used to make the same unit as that of Example 1, and two cases of the case where a dust is supplied at dust load amount of a unit from an upstream side, and the case where a dust was supplied from a downstream side was obtained and, as a result, the upstream side supply was 46 g/unit, and the downstream side supply was 30 g/unit. Thus, a retention volume was clearly higher when supplied from a fine side.

In addition, to a downstream side of this filtering medium was adhesion-integrated an electret nonwoven fabric A (polypropylene melt-blown nonwoven fabric of weight 20 g/m², average fiber diameter 2.4 μm, a pressure drop 28 Pa, efficiency of capturing 0.3 to 0.5 μm particles η=95%, thickness 0.12 mm) to prepare a high dust collecting filtering medium (filter drop 30.4 Pa) having a thickness of 0.56 mm, which can also capture fine dusts.

This high dust collecting filtering medium was used to prepare the same unit as that of Example 1, and unit performance was obtained and, as a result, a pressure drop was 53.6 Pa (structure pressure drop 30 Pa), an efficiency of capturing 0.3 to 0.5 μm particles was 96%, and a gas removal efficiency based on JEMA1467 specification was 95% for acetaldehyde, 72% for ammonia, and 98% for acetic acid. The filter could be confirmed to be a low pressure drop high dust collecting deodorizing HEPA filter having a high removal rate a for an acetaldehyde gas and an acetic acid gas, in which a threshold was particularly high.

Example 7

A nonwoven fabric sheet of a bilayer structure was prepared. An upstream side was the fiber aggregate (weight 24.5 g/m²) used in Example 4, and a downstream side was a fiber aggregate of a weight of 30 g/m² composed of a non-crimped polyvinyl alcohol fiber (35% by mass of Young's modulus 250 cN/dtex, fineness 17 dtex, fiber length 12 mm), and a non-crimped polyester fiber ((a) 30% by mass of Young's modulus 65 cN/dtex, fineness 1.3 dtex, fiber length 5 mm, (b) 35% by mass of Young's modulus 95 cN/dtex, fineness 1.3 dtex, fiber length 5 mm,), and a fiber aggregate of a bilayer structure having a weight (54.5 g/m²) was prepared by a wet sheet making method. Thereafter, the fiber aggregate was immersed in resin liquid solid matter 20% liquid obtained by mixing a styrene acryl polymer (glass transition point temperature Tg 30° C., film making temperature 45° C.) and a urethane polymer at a ratio of 3:1 as expressed by a weight ratio, and this was dry heat-treated to fix between single fibers to prepare a nonwoven fabric sheet having a weight of 66.5 g/m², a thickness of 0.52 mm, an apparent density of 0.13 g/cm³, a specific strength of 1269 N·cm/g, a pressure drop of 2.7 Pa. An efficiency of capturing 0.3 to 0.5 μm particles was 21%.

Only to an upstream side of this nonwoven fabric sheet was adhered a gas adhering substance C-liquid containing active carbon and zeolite at a solid matter of 32 g/m² by a coating method to obtain a filtering medium having a weight of 98.5 g/m², a thickness of 0.53 mm, a pressure drop of 13.5 Pa, an apparent density of 0.186 g/cm³, a specific strength of 672 N·cm/g, a weight variation rate of 7%, and an acetaldehyde deodorization rate of 71%.

This filtering medium was used to prepare the same unit as that of Example 1, and a JEMA dust collecting efficiency was obtained to be 85%. In addition, a gas removal efficiency was obtained based on JEMA1467 specification and, as a result, a gas removal efficiency was 47% for acetaldehyde, 82% for ammonia, and 78% for acetic acid.

A smoke of 200 tobaccos corresponding to general home for one month was loaded on this filter, the filter was washed with water, and dried, and a JEMA dust collecting efficiency was obtained to be 86%, and there was hardly change. In addition, a gas removal efficiency exerted almost equivalent performance to initial performance, such as 43% for acetaldehyde, 80% for ammonia, and 74% for acetic acid, and it could be confirmed that the unit was a filter unit for an air cleaner, which can be recycled.

Since an electret nonwoven fabric of extremely thin fibers was not contained, and water is easily removed from the filter unit, therefore, a drying time is short, and the unit was a highly practical filter unit for an air cleaner.

Example 8

A nonwoven fabric sheet in which a fiber length of each of the non-crimped polyvinyl alcohol fiber and the non-crimped polyester fiber used in Example 1 was changed to 28 mm, was prepared, properties of a filtering medium to which the same amount of a gas adsorbing substance of the A-liquid used in Example 1 was adhered, was assessed, and a thickness was 0.47 mm, an apparent density was 0.179 g/cm³, a specific strength was 509 N·cm/g, a pressure drop was 0.6 Pa, an efficiency of capturing 0.3 to 0.5 μm particles was 3%, a weight variation rate was 31%, and an acetaldehyde deodorization rate was 45%. Since a weight variation rate is greater than that of example 1, an acetaldehyde deodorization was low, thus, it could be confirmed that a weight variation rate is important for improving deodorization performance.

Example 9

A nonwoven fabric sheet having a fiber construction used in Example 1 was prepared, and a filtering medium having a pH of 6.1, to which a gas adsorbing substance of the G-liquid containing active carbon obtained by washing coconut shell active carbon with water, and adjusting a pH was adhered, was prepared. A pH of the filtering medium of Example 1 was 7.3. An acetaldehyde deodorization rate of the filtering medium was 83% being higher than that of Example 1, a deodorization rate as the unit was such that a deodorization rate of ammonia and that of acetic acid were hardly changed from those of Example 1, but it could be conformed that a deodorization rate of acetaldehyde is 89%, thus, was improved. In addition, when an exhaust odor from the filter was organoleptically accessed, a weak active carbon material odor was felt in Example 1, but a material odor was hardly felt in the present example. In addition, a molded filter unit was mounted in an air cleaner, and arranged in a smoking room and, after half a year (the number of smoked tobaccos, 400), an exhaust odor from the filter was organoleptically assessed and, as a result, a sour odor was weaker than that of Example 1, and it could be confirmed that the unit was more excellent.

Comparative Example 1

In order to test influence of a fiber construction of a nonwoven fabric sheet, a fiber construction of the nonwoven fabric sheet used in Example 1 was changed as follows to prepare a filtering medium. A crimped polyester fiber ((a) 50% by mass of Young's modulus 65 cN/dtex, fineness 10 dtex, fiber length 28 mm, (b) 50% by mass of Young's modulus 65 cN/dtex, fineness 7 dtex, fiber length 28 mm) was passed through a card to prepare a web having a weight of 24.5 g/m$^2$ and, further, a resin was imparted to this fiber aggregate under the same condition as that of Example 1 to prepare a nonwoven fabric sheet in which the sheet is integrated between simple fibers (a weight of 35 g/m$^2$, a thickness of 0.20 mm, an apparent density of 0.18 g/cm$^3$, a specific strength of 156 N·cm/g, a pressure drop of 0.5 Pa).

To this nonwoven fabric sheet was adhered a gas adsorbing substance of the A-liquid as a gas adsorbing substance at a solid matter of 32 g/m$^2$ by an impregnation drying method to prepare a filtering medium having a weight of 67.0 g/m$^2$, a thickness of 0.2 mm, an apparent density of 0.335 g/cm$^3$, and a specific strength of 81 N·cm/g. A weight variation rate of this filtering medium was as great as 63%, thus, a weight variation was very large. Further, when an acetaldehyde adsorption rate was obtained, it was found to be as low as 14%. Increase in a pressure drop was as small as 0.5 Pa before active carbon coating, and 0.7 Pa after coating, but since a weight variation was great, an acetaldehyde deodorization rate was very low.

On this filtering medium was adhesion-integrated an electret nonwoven fabric B used in Example 4 (polypropylene melt-blown nonwoven fabric of weight 30 g/m$^2$, average fiber diameter 1.2 μm, a pressure drop 55 Pa, efficiency of capturing 0.3 to 0.5 μm particles η=99.992, thickness 0.18 mm) to prepare a high dust collecting filtering medium. Further, when the same filter unit as that of Example 4 was prepared, and performance was assessed under the same condition, the pressure drop of the unit was 94.4 Pa (structure pressure drop 51 Pa), and the filtering medium was soft, occurrence of a structure pressure drop due to filtering medium deformation accompanied with an air pressure was great, and a collecting efficiency was 99.967%, thus, the unit was not provided with HEPA performance. Further, when a gas removal efficiency was obtained based on JEMA1467 specification and, as a result, in spite of use of the gas adsorbing substance A-liquid, since a weight variation rate was great, all removal rates were as low as 13% for acetaldehyde, 31% for ammonia, and 33% for acetic acid, thus, the filter unit was a filter unit of a high pressure drop low deodorization performance.

Comparative Example 2

A fiber aggregate having a weight 36.4 g/m$^2$ composed of a non-crimped polyester fiber ((a) 60% by mass of Young's modulus 65 cN/dtex, fineness 10 dtex, fiber length 10 mm, (b) 29% by mass of Young's modulus 95 cN/dtex, fineness 3 dtex, fiber length 10 mm), and a pulp (19% by mass) was produced. Thereafter, the fiber aggregate was immersed in a resin liquid solid matter 30% liquid obtained by mixing a styrene acryl polymer (glass transition point temperature Tg 30° C., film making temperature 45° C.) and a urethane polymer at a ratio of 3:1 as expressed by a weight ratio, this was dry heat-treated to fix between single fibers, to make a nonwoven fabric sheet having a weight of 52 g/m$^2$, a thickness of 0.43 mm, an apparent density of 0.12 g/cm$^3$, a specific strength of 317 N·cm/g, and a pressure drop of 0.5 Pa.

To this nonwoven fabric sheet was adhered a gas adsorbing substance of the A-liquid as a gas adsorbing substance at a solid matter of 32 g/m$^2$ by an impregnation drying method, to prepare a filtering medium having a weight of 84 g/m$^2$, a thickness of 0.42 mm, an air permeation degree of 230 cm$^3$/cm$^2$·sec, an apparent density of 0.20 g/cm$^3$, a specific strength of 135 N·cm/g, a pressure drop of 2.5 Pa, and a weight variation rate of 8%.

In addition, on this filtering medium was adhesion-integrated the electret nonwoven fabric B used in Example 4 (propylene melt-brown nonwoven fabric having weight of 30 g/m$^2$, average fiber diameter of 1.2 μm, a pressure drop of 55 Pa, an efficiency of collecting 0.3μ to 0.5 μm particles η=99.992%, and a thickness of 0.18 mm), to prepare a high dust collecting filtering medium (pressure drop 57.6 Pa) having a thickness of 0.62 mm, which can also capture fine dusts.

This high dust collecting filtering medium was pleats-processed into a crest height of 35 mm, and this was accommodated in a frame having a filter size of a width 250 mm, a length 450 mm and a thickness of 37 mm, to obtain a filter unit for an air cleaner having a filtering medium area of 2.0 m$^2$. Regarding this filter unit, the unit pressure drop was measured at an air volume of 7 m$^3$/min and, as a result, occurrence of structure of pressure drop was as great as 89.8 Pa (structure pressure drop 45 Pa), and it could be confirmed that the unit pressure drop was considerably greater than a unit pressure drop of 68.1 Pa of Example 4. The reason is that a mixing rate of a fiber having a high Young's modulus was small, therefore, filtering medium deformation was great.

Comparative Example 3

The F liquid containing active carbon particles having a particle diameter of 55 μm was applied to the nonwoven fabric sheet used in Example 1 under the same condition as that of Example 1. Since a particle diameter of active carbon was as great as 55 μm, adhesion to a nonwoven fabric surface was great, and the pressure drop was high. In addition, when this nonwoven fabric sheet was pleats-processed, since active carbon particles roughened a filtering medium surface, a friction resistance was great, running in an instrument was not smooth, and an extremely large amount of active carbon was dropped, and practicality could not be obtained.

Comparative Example 4

By a wet sheet making method of a inclination wire system, a fiber aggregate having a weight of 36.4 g/m² composed of a non-crimped polyvinyl alcohol fiber (18% by mass of Young's modulus 320 cN/dtex, fineness 7 dtex, fiber length 10 mm), a non-crimped polyester fiber (63% by mass of Young's modulus 65 cN/dtex, fineness 1.3 dtex, fiber length 5 mm), and a pulp (19% by mass) was prepared. Thereafter, the fiber aggregate was immersed in a resin liquid solid matter 30% liquid obtained by mixing a styrene acryl polymer (glass transition point temperature Tg 30° C., film making temperature 45° C.) and a urethane polymer at a ratio of 3:1 as expressed by a weight ratio, this was dry heat-treated to fix between single fibers, to make a nonwoven fabric sheet having a weight of 52 g/m², a thickness of 0.29 mm, an apparent density of 0.18 g/cm³, a pressure drop of 4.8 Pa, and a specific strength of 250 N·cm/g.

To this nonwoven fabric sheet was adhered a gas adsorbing substance of the A-liquid as a gas adsorbing substance at a solid matter of 32 g/m² by an impregnation drying method, to prepare a filtering medium having a weight of 84 g/m², a thickness of 0.25 mm, an apparent density of 0.336 g/cm³, a specific strength of 128 N·cm/g, a pressure drop of 20 Pa, a weight variation rate of 10%, an acetaldehyde deodorization rate of 42%, and an efficiency of collecting 0.3 to 0.5 μm particles of 30%.

Since a fiber construction was such that a blending ratio of a skeleton fiber was as small as a blending ratio of a fiber of 7 dtex or more of 18%, and a 1.3 dtex soft thin fiber having a Young's modulus of 65 cN/dtex was as large as 63% and, as a nonwoven fabric sheet, a thickness was small as 0.29 mm, and an apparent density was as high as 0.18 g/cm³. A gas adsorbing substance was adhered to such a nonwoven fabric sheet and, as a result, an apparent density of the filtering medium became as high as 0.336 g/cm³, the pressure drop became as very large as 20 Pa as a result of clogging, and an acetaldehyde deodorization rate was as low as 42%. It could be confirmed that in order to retain an acetaldehyde deodorization efficiency high, a fiber construction for maintaining an apparent density of a nonwoven fabric fiber sheet low is important.

Comparative Example 5

When an acetaldehyde removal rate of the nonwoven fabric sheet used in Example 1 was assessed, it was 1%. It could be confirmed that only a fiber does not afford a high removal rate.

Comparative Example 6

A nonwoven fabric sheet using a glass fiber (50% by mass of Young's modulus 326000 cN/dtex, fineness 3 dtex, fiber length 5 mm) as a fiber having a high Young's modulus, a non-crimped polyester fiber (31% by mass of Young's modulus 65 cN/dtex, fineness 1.3 dtex, fiber length 5 mm), and 19% of a pulp was prepared to obtain a filtering medium with a deodorizing agent adhered thereto. This was a filtering medium having a high specific strength, and a high stiffness, but a glass fiber was napped on a surface, and there was a problem on safety. In order to assess pleats-processability, when pleats-processing was performed by a rotary system, the sheet was broken at a striped portion, a broken glass fiber was flown, there was a problem on not only safety but also processing suitability, thus, the sheet was a filtering medium which cannot be used.

Comparative Example 7

When a fiber consisting of an aramide fiber (50% by mass of Young's modulus 4400 cN/dtex, fineness 3 dtex, fiber length 10 mm) as a high Young's modulus fiber, a non-crimped polyester fiber (19% by mass of Young's modulus 65 cN/dtex, fineness 1.3 dtex, fiber length 5 mm) and 19% by mass of a pulp was subjected to a refiner to perform disperse fibers, an aramide fiber in addition to the pulp was fibrillated to prepare a clogged fiber aggregate. This was impregnated with a resin to obtain a nonwoven fabric sheet, and this had a high pressure drop. In a filtering medium obtained by adhering a deodorizing agent to this, a surface was further clogged to considerably increase a pressure drop, and unit performance and a deodorization rate were low. It was found that an aramide fiber which easily close between fibers is not suitable.

Comparative Example 8

A nonwoven fabric sheet consisting of a crimped polyvinyl alcohol fiber (50% by mass of Young's modulus 80 cN/dtex, fineness 1.7 dtex, fiber length 10 mm) as a Young's modulus fiber, a crimped polyester fiber having a normal Young's modulus (31% by mass of Young's modulus 65 cN/dtex, fineness 7 dtex, fiber length 28 mm) and 19% by mass of a pulp was prepared. Since there was crimping, a bulky sheet having a low fiber density was obtained, but a specific strength was low. A specific strength of a filtering medium with a deodorizing agent adhered thereto was as low as 100 N·cm/g, and the filtering material was easily stretched. In addition, since there was crimping, a weight variation rate was as great as 32%, and it was seen that dispersibility of fibers was bad. When a filtering medium in which an electrification-processed nonwoven fabric was laminated on this was used to prepare a unit, and performance was assessed, a pressure drop was high, and deodorization performance was low. The reason is as follows: since a specific strength was low, a filtering medium was deformed with an air pressure, the air does not uniformly flow somewhere, thus, the great structure pressure drop occurred. In addition, as a result, a collecting efficiency was reduced, and a weight variation rate was also great, therefore, a great flow rate is generated somewhere, and it was seen that a deodorization efficiency was reduced.

From this result, it was found that, in order to obtain high deodorizing property, it is necessary that a high specific strength and weight uniformity are realized using a non-crimped yarn.

Further, conditions of Examples and Comparative Examples, and assessment of results are summarized in Table 1 to 7. Tables 1 and 2 show a constituent fiber of a fiber aggregate, Table 3 to Table 6 show a construction and properties of a nonwoven fabric sheet, a filtering medium and a filter unit, and Table 7 shows a construction of an electret nonwoven fabric used in Examples, and Comparative Examples.

The filtering medium and the filter unit according to embodiments of the present invention can be suitably used, for example, as a home air cleaner filter (particularly, a filter unit for home electronics) and, additionally, can be suitably used for machines and instruments such as a filter for building/factory air conditioning, a filter for housing 24 hours ventilation, a filter for hospitals, a filter for automobiles and the like.

TABLE 1

| | | | Young's modulus [cN/dtex] | Fineness [dtex] | Fiber length [mm] | Example 1 | Example 2 | Example 3 | Example 4 | Example 5 |
|---|---|---|---|---|---|---|---|---|---|---|
| Fiber aggregate | non-crimped | Polyvinyl alcohol fiber (% by mass) | 150 | 7 | 10 | 32 | 81 | 32 | 0 | 0 |
| | | | 150 | 7 | 28 | 0 | 0 | 0 | 0 | 0 |
| | | | 180 | 7 | 10 | 0 | 0 | 0 | 19.2 | 19.2 |
| | | | 250 | 17 | 12 | 29 | 0 | 29 | 51.4 | 51.4 |
| | | | 250 | 17 | 28 | 0 | 0 | 0 | 0 | 0 |
| | | | 320 | 7 | 10 | 0 | 0 | 0 | 0 | 0 |
| | | | 320 | 17 | 12 | 0 | 0 | 0 | 0 | 0 |
| | | Polyester fiber (% by mass) | 65 | 1.3 | 5 | 5 | 0 | 5 | 0 | 0 |
| | | | 65 | 1.3 | 28 | 0 | 0 | 0 | 0 | 0 |
| | | | 65 | 3 | 10 | 15 | 0 | 15 | 0 | 0 |
| | | | 65 | 3 | 28 | 0 | 0 | 0 | 0 | 0 |
| | | | 65 | 10 | 10 | 0 | 0 | 0 | 0 | 0 |
| | | | 95 | 1.3 | 5 | 0 | 0 | 0 | 0 | 0 |
| | | | 95 | 3 | 10 | 0 | 0 | 0 | 10 | 10 |
| | crimped | Polyester fiber (% by mass) | 65 | 10 | 28 | 0 | 0 | 0 | 0 | 0 |
| | | | 65 | 7 | 28 | 0 | 0 | 0 | 0 | 0 |
| | | Pulp (% by mass) | | | | 19 | 19 | 19 | 19.4 | 19.4 |
| | | Nonwoven fabric production process | | | | WET | WET | WET | WET | WET |

| | | | Young's modulus [cN/dtex] | Fineness [dtex] | Fiber length [mm] | Example 6 | Example 7 | Example 8 | Example 9 |
|---|---|---|---|---|---|---|---|---|---|
| Fiber aggregate | non-crimped | Polyvinyl alcohol fiber (% by mass) | 150 | 7 | 10 | 0 | 0 | 0 | 0 | 0 | 32 |
| | | | 150 | 7 | 28 | 0 | 0 | 0 | 32 | 0 |
| | | | 180 | 7 | 10 | 19.2 | 0 | 19.2 | 0 | 0 |
| | | | 250 | 17 | 12 | 51.4 | 0 | 51.4 | 35 | 0 | 29 |
| | | | 250 | 17 | 28 | 0 | 0 | 0 | 0 | 29 | 0 |
| | | | 320 | 7 | 10 | 0 | 45 | 0 | 0 | 0 |
| | | | 320 | 17 | 12 | 0 | 0 | 0 | 0 | 0 |
| | | Polyester fiber (% by mass) | 65 | 1.3 | 5 | 0 | 10 | 0 | 30 | 0 | 5 |
| | | | 65 | 1.3 | 28 | 0 | 0 | 0 | 0 | 5 | 0 |
| | | | 65 | 3 | 10 | 0 | 0 | 0 | 0 | 0 | 15 |
| | | | 65 | 3 | 28 | 0 | 0 | 0 | 0 | 15 | 0 |
| | | | 65 | 10 | 10 | 0 | 0 | 0 | 0 | 0 |
| | | | 95 | 1.3 | 5 | 0 | 10 | 0 | 35 | 0 | 0 |
| | | | 95 | 3 | 10 | 10 | 35 | 10 | 0 | 0 | 0 |
| | crimped | Polyester fiber (% by mass) | 65 | 10 | 28 | 0 | 0 | 0 | 0 | 0 |
| | | | 65 | 7 | 28 | 0 | 0 | 0 | 0 | 0 |
| | | Pulp (% by mass) | | | | 19.4 | 0 | 19.4 | 0 | 19 | 19 |
| | | Nonwoven fabric production process | | | | WET | WET | WET | WET | WET | WET |

WET: Wet paper making method

TABLE 2

| | | | Young's modulus [cN/dtex] | Fineness [dtex] | Fiber length [mm] | Comparative example 1 | Comparative example 2 | Comparative example 3 | Comparative example 4 |
|---|---|---|---|---|---|---|---|---|---|
| Fiber aggregate | non-crimped | Polyvinyl alcohol fiber (% by mass) | 150 | 7 | 10 | 0 | 0 | | 0 |
| | | | 150 | 7 | 28 | 0 | 0 | 0 | 0 |
| | | | 180 | 7 | 10 | 0 | 0 | 0 | 0 |
| | | | 250 | 17 | 12 | 0 | 0 | 29 | 0 |
| | | | 250 | 17 | 28 | 0 | 0 | 0 | 0 |
| | | | 320 | 7 | 10 | 0 | 0 | 0 | 18 |
| | | | 320 | 17 | 12 | 0 | 0 | 0 | 0 |
| | | Polyester fiber (% by mass) | 65 | 1.3 | 5 | 0 | 0 | 5 | 63 |
| | | | 65 | 1.3 | 28 | 0 | 0 | 0 | 0 |
| | | | 65 | 3 | 10 | 0 | 0 | 15 | 0 |
| | | | 65 | 3 | 28 | 0 | 0 | 0 | 0 |
| | | | 65 | 10 | 10 | 0 | 60 | 0 | 0 |
| | | | 95 | 1.3 | 5 | 0 | 0 | 0 | 0 |
| | | | 95 | 3 | 10 | 0 | 29 | 0 | 0 |
| | | Glass fiber (% by mass) | 326000 | 3 | 5 | 0 | 0 | 0 | 0 |
| | | Aromatic polyamide fiber (% by mass) | 4400 | 3 | 10 | 0 | 0 | 0 | 0 |
| | crimped | Polyester fiber (% by mass) | 65 | 10 | 28 | 50 | 0 | 0 | 0 |
| | | | 65 | 7 | 28 | 50 | 0 | 0 | 0 |
| | | Polyvinyl alcohol fiber | 80 | 1.7 | 10 | 0 | 0 | 0 | 0 |
| | | Pulp (% by mass) | | | | 0 | 19 | 19 | 19 |
| | | Nonwoven fabric production process | | | | DRY-C | WET | WET | WET |

TABLE 2-continued

|  |  |  | Young's modulus [cN/dtex] | Fineness [dtex] | Fiber length [mm] | Comparative example 5 | Comparative example 6 | Comparative example 7 | Comparative example 8 |
|---|---|---|---|---|---|---|---|---|---|
| Fiber aggregate | non-crimped | Polyvinyl alcohol fiber (% by mass) | 150 | 7 | 10 | 32 | 0 | 0 | 0 |
|  |  |  | 150 | 7 | 28 | 0 | 0 | 0 | 0 |
|  |  |  | 180 | 7 | 10 | 0 | 0 | 0 | 0 |
|  |  |  | 250 | 17 | 12 | 29 | 0 | 0 | 0 |
|  |  |  | 250 | 17 | 28 | 0 | 0 | 0 | 0 |
|  |  |  | 320 | 7 | 10 | 0 | 0 | 0 | 0 |
|  |  |  | 320 | 17 | 12 | 0 | 0 | 0 | 0 |
|  |  | Polyester fiber (% by mass) | 65 | 1.3 | 5 | 5 | 31 | 31 | 0 |
|  |  |  | 65 | 1.3 | 28 | 0 | 0 | 0 | 0 |
|  |  |  | 65 | 3 | 10 | 15 | 0 | 0 | 0 |
|  |  |  | 65 | 3 | 28 | 0 | 0 | 0 | 0 |
|  |  |  | 65 | 10 | 10 | 0 | 0 | 0 | 0 |
|  |  |  | 95 | 1.3 | 5 | 0 | 0 | 0 | 0 |
|  |  |  | 95 | 3 | 10 | 0 | 0 | 0 | 0 |
|  |  | Glass fiber (% by mass) | 326000 | 3 | 5 | 0 | 50 | 0 | 0 |
|  |  | Aromatic polyamide fiber (% by mass) | 4400 | 3 | 10 | 0 | 0 | 50 | 0 |
|  | crimped | Polyester fiber (% by mass) | 65 | 10 | 28 | 0 | 0 | 0 | 0 |
|  |  |  | 65 | 7 | 28 | 0 | 0 | 0 | 31 |
|  |  | Polyvinyl alcohol fiber | 80 | 1.7 | 10 | 0 | 0 | 0 | 50 |
|  |  | Pulp (% by mass) |  |  |  | 19 | 19 | 19 | 19 |
|  |  | Nonwoven fabric production process |  |  |  | WET | WET | WET | WET |

WET: Wet paper making method
DRY-C: Dry chemical bond method

TABLE 3

|  |  | Example 1 | Example 2 | Example 3 | Example 4 |
|---|---|---|---|---|---|
| Nonwoven fabric sheet | Weight of fiber (g/m$^2$) | 36.4 | 36.4 | 36.4 | 24.5 |
|  | Weight of resin fixing between single yarns (g/m$^2$) | 15.6AC/U | 15.6AC/U | 15.6AC/U | 10.5AC/U |
|  | Weight of sheet (g/m$^2$) | 52 | 52 | 52 | 35 |
|  | Thickness (mm) | 0.46 | 0.48 | 0.46 | 0.37 |
|  | Apparent density (g/cm$^3$) | 0.11 | 0.11 | 0.11 | 0.09 |
|  | Tensile strength generated at 1% elongation (N/cm$^2$) | 112.2 | 100 | 112.2 | 69 |
|  | Specific strength (N·cm/g) | 1020 | 909 | 1020 | 767 |
|  | Pressure drop (Pa) | 0.5 | 0.3 | 0.5 | 0.4 |
|  | Efficiency of collecting 0.3 to 0.5 μm particles (%) | 5.2 | 5.0 | 5.2 | 6.0 |
| Filter | Liquid of a gas adsorbing substance | A | A | E | B |
|  | Weight of gas adsorbing substance | 32 | 32 | 32 | 32 |
|  | Particle diameter of gas adsorbing substance (μm) | 24 | 24 | 24 | 5 |
|  | Weight of filter (g/m$^2$) | 84 | 84 | 84 | 67 |
|  | Thickness of filter (mm) | 0.46 | 0.48 | 0.46 | 0.37 |
|  | Apparent density (g/cm$^3$) | 0.183 | 0.175 | 0.183 | 0.181 |
|  | Tensile strength at 1% elongation (N·cm$^2$) | 100 | 95 | 100 | 67 |
|  | Specific strength (N·cm/g) | 546 | 543 | 546 | 370 |
|  | Pressure drop (Pa) | 0.8 | 0.5 | 0.8 | 0.63 |
|  | Weight variation rate (%) | 10 | 11 | 10 | 8 |
|  | Deodorization rate of acetaldehyde (%) | 70 | 61 | 65 | 79 |
|  | Electret nonwoven fabric | A | — | — | B |
| High dust collecting filtering medium | Thickness (mm) | 0.58 | — | — | 0.55 |
|  | Pressure drop (Pa) | 28.9 | — | — | 55.7 |
| Filter unit | Size (mm) | 250 × 450 × 37 | — | — | 250 × 450 × 37 |
|  | Crest height of pleats (mm) | 35 | — | — | 35 |
|  | Air flow (m$^3$/min) | 7 | — | — | 7 |
|  | Filtering medium area (m$^2$) | 2 | — | — | 2 |
|  | Filtering medium penetration air rate (m/min) | 3.5 | — | — | 3.5 |
|  | Pressure drop of unit (Pa) | 49.0 | — | — | 68.1 |
|  | Efficiency of collecting 0.3 to 0.5 μm particles of unit (%) | 98.2 | — | — | 99.987 |
|  | Pressure drop of filter (Pa) | 22.5 | — | — | 43.3 |
|  | Structure pressure drop (Pa) | 26.5 | — | — | 24.8 |

TABLE 3-continued

|  |  | Example 1 | Example 2 | Example 3 | Example 4 |
|---|---|---|---|---|---|
| Deodorization rate (%) | Ammonia | 93.8 | — | — | 73.0 |
|  | Acetaldehyde | 75.4 | — | — | 96.0 |
|  | Acetic acid | 90.3 | — | — | 83.0 |

AC/U: Mixture of styrene acryl polymer and urethane polymer

TABLE 4

|  |  | Example 5 | Example 6 | Example 7 | Example 8 | Example 9 |
|---|---|---|---|---|---|---|
| Nonwoven fabric sheet | Weight of fiber (g/m$^2$) | 24.5 | 24.5    13 | 24.5    30 | 36.4 | 36.4 |
|  | Weight of resin fixing between single yarns (g/m$^2$) | 10.5AC/U | 11.9AC/U | 12.0AC/U | 15.6AC/U | 15.6AC/U |
|  | Weight of sheet (g/m$^2$) | 35 | 49.4 | 66.5 | 52 | 52 |
|  | Thickness (mm) | 0.37 | 0.45 | 0.52 | 0.47 | 0.46 |
|  | Apparent density (g/cm$^3$) | 0.09 | 0.11 | 0.13 | 0.11 | 0.11 |
|  | Tensile strength at 1% elongation (N/cm$^2$) | 69 | 102 | 165 | 93 | 112.2 |
|  | Specific strength (N · cm/g) | 767 | 927 | 1269 | 845 | 1020 |
|  | Pressure drop (Pa) | 0.4 | 1.2 | 2.7 | 0.4 | 0.5 |
|  | Efficiency of collecting 0.3 to 0.5 μm particles (%) | 6.0 | 15.0 | 21.0 | 3.0 | 5.2 |
| Filter | Liquid of a gas adsorbing substance | C | B & D | C | A | G |
|  | Weight of gas adsorbing substance | 32 | 32&20 | 32 | 32 | 32 |
|  | Particle diameter of gas adsorbing substance (μm) | 24 | 5&2 | 24 | 24 | 24 |
|  | Weight of filter (g/m$^2$) | 67 | 101.5 | 98.5 | 84 | 84 |
|  | Thickness of filter (mm) | 0.37 | 0.44 | 0.53 | 0.47 | 0.46 |
|  | Apparent density (g/cm$^3$) | 0.181 | 0.231 | 0.186 | 0.179 | 0.183 |
|  | Tensile strength generated at 1% elongation (N · cm$^2$) | 67 | 100 | 125 | 91 | 100 |
|  | Specific strength (N · cm/g) | 370 | 433 | 672 | 509 | 548 |
|  | Pressure drop (Pa) | 0.7 | 2.3 | 13.5 | 0.6 | 0.8 |
|  | Weight variation rate (%) | 8 | 7 | 7 | 31 | 10 |
|  | Deodorization rate of acetaldehyde (%) | 40 | 81 | 70 | 45 | 83 |
|  | Electret nonwoven fabric | A | A | — | — | A |
| High dust collecting filtering medium | Thickness (mm) | 0.49 | 0.56 | 0.65 | — | 0.58 |
|  | Pressure drop (Pa) | 28.8 | 30.4 | 13.5 | — | 28.9 |
| Filter unit | Size (mm) | 250 × 225 × 37 | 250 × 450 × 37 | 250 × 450 × 37 | — | 250 × 450 × 37 |
|  | Crest height of pleats (mm) | 35 | 35 | 35 | — | 35 |
|  | Air flow (m$^3$/min) | 3.5 | 7 | 7 | — | 7 |
|  | Filtering medium area (m$^2$) | 1 | 2 | 2 | — | 2 |
|  | Filtering medium penetration air rate (m/min) | 3.5 | 3.5 | 3.5 | — | 3.5 |
|  | Pressure drop of unit (Pa) | 50.4 | 53.6 | — | — | 49.0 |
|  | Efficiency of collecting 0.3 to 0.5 μm particles of unit (%) | 96 | 96 | — | — | 98.2 |
|  | Pressure drop of fiiter (Pa) | 22.4 | 23.6 | — | — | 22.5 |
|  | Structure pressure drop (Pa) | 28.0 | 30.0 | — | — | 26.5 |
|  | Deodorization rate (%)    Ammonia | 80.0 | 72.0 | 82.0 | — | 93.0 |
|  | Acetaldehyde | 46.0 | 95.0 | 47.0 | — | 89.0 |
|  | Acetic acid | 78.0 | 98.0 | 78.0 | — | 90.0 |

AC/U: Mixture of styrene acryl polymer and urethane polymer

TABLE 5

|  |  | Comparative example 1 | Comparative example 2 | Comparative example 3 | Comparative example 4 |
|---|---|---|---|---|---|
| Nonwoven fabric sheet | Weight of fiber (g/m$^2$) | 24.5 | 36.4 | 36.4 | 36.4 |
|  | Weight of resin fixing between single yarns (g/m$^2$) | 10.5AC/U | 15.6AC/U | 15.6AC/U | 15.6AC/U |
|  | Weight of sheet (g/m$^2$) | 35 | 52 | 52 | 52 |
|  | Thickness (mm) | 0.2 | 0.43 | 0.46 | 0.29 |
|  | Apparent density (g/cm$^3$) | 0.18 | 0.12 | 0.11 | 0.18 |
|  | Tensile strength at 1% elongation (N/cm$^2$) | 28 | 38 | 112.2 | 45 |
|  | Specific strength (N · cm/g) | 156 | 317 | 1020 | 250 |
|  | Pressure drop (Pa) | 0.5 | 1.4 | 0.5 | 4.8 |

TABLE 5-continued

|  |  | Comparative example 1 | Comparative example 2 | Comparative example 3 | Comparative example 4 |
|---|---|---|---|---|---|
| Filter | Efficiency of collecting 0.3 to 0.5 μm particles (%) | under 1.0 | 6.5 | 5.2 | 30.0 |
|  | Liquid of a gas adsorbing substance | A | A | F | A |
|  | Weight of gas adsorbing substance | 32 | 32 | 32 | 32 |
|  | Particle diameter of gas adsorbing substance (μm) | 24 | 24 | 55 | 24 |
|  | Weight of filter (g/m$^2$) | 67 | 84 | 84 | 84 |
|  | Thickness of filter (mm) | 0.2 | 0.42 | 0.48 | 0.25 |
|  | Apparent density (g/cm$^3$) | 0.335 | 0.200 | 0.175 | 0.336 |
|  | Tensile strength generated at 1% elongation (N · cm$^2$) | 27 | 27 | 100 | 43 |
|  | Specific strength (N · cm/g) | 81 | 135 | 571 | 128 |
|  | Pressure drop (Pa) | 0.7 | 2.5 | 4 | 20 |
|  | Weight variation rate (%) | 63 | 8 | 10 | 10 |
|  | Deodorization rate of acetaldehyde (%) | 14 | — | — | 42 |
| High dust collecting filtering medium | Electret nonwoven fabric | B | B | — | — |
|  | Thickness (mm) | 0.38 | 0.6 | — | — |
|  | Pressure drop (Pa) | 55.8 | 57.6 | — | — |
| Filter unit | Size (mm) | 250 × 450 × 37 | 250 × 450 × 37 | — | — |
|  | Crest height of pleats (mm) | 35 | 35 | — | — |
|  | Air flow (m$^3$/min) | 7 | 7 | — | — |
|  | Filtering medium area (m$^2$) | 2 | 2 | — | — |
|  | Filtering medium penetration air rate (m/min) | 3.5 | 3.5 | — | — |
|  | Pressure drop of unit (Pa) | 94.4 | 89.8 | — | — |
|  | Efficiency of collecting 0.3 to 0.5 μm particles of unit (%) | 99.967 | 99.968 | — | — |
|  | Pressure drop of fiiter (Pa) | 43.4 | 44.8 | — | — |
|  | Structure pressure drop (Pa) | 51.0 | 45.0 | — | — |
|  | Deodorization rate (%) — Ammonia | 31.0 | — | — | — |
|  | Acetaldehyde | 13.0 | — | — | — |
|  | Acetic acid | 33.0 | — | — | — |

AC/U: Mixture of styrene acryl polymer and urethane polymer

TABLE 6

|  |  | Comparative example 5 | Comparative example 6 | Comparative example 7 | Comparative example 8 |
|---|---|---|---|---|---|
| Nonwoven fabric sheet | Weight of fiber (g/m$^2$) | 36.4 | 36.4 | 36.4 | 36.4 |
|  | Weight of resin fixing between single yarns (g/m$^2$) | 15.6AC/U | 15.6AC/U | 15.6AC/U | 15.6AC/U |
|  | Weight of sheet (g/m$^2$) | 52 | 52 | 52 | 52 |
|  | Thickness (mm) | 0.46 | 0.32 | 0.29 | 0.5 |
|  | Apparent density (g/cm$^3$) | 0.11 | 0.163 | 0.179 | 0.104 |
|  | Tensile strength at 1% elongation (N/cm$^2$) | 112.2 | 220 | 90 | 13 |
|  | Specific strength (N · cm/g) | 1020 | 1350 | 503 | 125 |
|  | Pressure drop (Pa) | 0.5 | 5.1 | 8.5 | 2.7 |
|  | Efficiency of collecting 0.3 to 0.5 μm particles (%) | 5.2 | 33.0 | 28.0 | 22.0 |
| Filter | Liquid of a gas adsorbing substance | — | A | A | A |
|  | Weight of gas adsorbing substance | — | 32 | 32 | 32 |
|  | Particle diameter of gas adsorbing substance (μm) | — | 24 | 24 | 24 |
|  | Weight of filter (g/m$^2$) | — | 84 | 84 | 84 |
|  | Thickness of filter (mm) | — | 0.31 | 0.28 | 0.42 |
|  | Apparent density (g/cm$^3$) | — | 0.271 | 0.300 | 0.200 |
|  | Tensile strength generated at 1% elongation (N · cm$^2$) | — | 240 | 240 | 20 |
|  | Specific strength (N · cm/g) | — | 886 | 500 | 100 |
|  | Pressure drop (Pa) | — | 6 | 30 | 3.1 |
|  | Weight variation rate (%) | — | 8 | 8 | 32 |
|  | Deodorization rate of acetaldehyde (%) | — | 33 | 28 | 40 |
| High dust collecting filtering medium | Electret nonwoven fabric | — | B | B | B |
|  | Thickness (mm) | — | 0.49 | 0.46 | 0.6 |
|  | Pressure drop (Pa) | — | 61.1 | 85.1 | 58.2 |
| Filter unit | Size (mm) | — | — | 250 × 450 × 37 | 250 × 450 × 37 |
|  | Crest height of pleats (mm) | — | — | 35 | 35 |
|  | Air flow (m$^3$/min) | — | — | 7 | 7 |
|  | Filtering medium area (m$^2$) | — | — | 2 | 2 |

TABLE 6-continued

|  | Comparative example 5 | Comparative example 6 | Comparative example 7 | Comparative example 8 |
|---|---|---|---|---|
| Filtering medium penetration air rate (m/min) | — | — | 3.5 | 3.5 |
| Pressure drop of unit (Pa) | — | — | 92.2 | 91.3 |
| Efficiency of collecting 0.3 to 0.5 μm particles of unit (%) | — | — | 99.968 | 99.913 |
| Pressure drop of filter (Pa) | — | — | 66.2 | 45.3 |
| Structure pressure drop (Pa) | — | — | 26.0 | 46.0 |
| Deodorization rate (%) Ammonia | — | — | 40.0 | 67.0 |
| Acetaldehyde | — | — | 31.0 | 52.0 |
| Acetic acid | — | — | 42.0 | 71.0 |

AC/U: Mixture of styrene acryl polymer and urethane polymer

TABLE 7

| Electret nonwoven fabric | A | B |
|---|---|---|
| Material | PPMB | PPMB |
| Fiber diameter(μm) | 2.4 | 1.2 |
| Weight (g/m$^2$) | 20 | 30 |
| Thickness (mm) | 0.12 | 0.18 |
| Pressure drop (Pa) | 28 | 55 |
| Efficiency of collecting 0.3 to 0.5 μm particles(%) | 95 | 99.992 |

PPMB: polypropylene melt blown nonwoven fabric

The invention claimed is:

1. A filtering medium comprising a non-woven fabric sheet containing mainly organic fibers in which single fibers are fixed, and a gas adsorbing substance having an average particle diameter of 40 μm or less adhered to the nonwoven fabric sheet, wherein an apparent density is 0.3 g/cm$^3$ or less, and a specific strength at 1% elongation is 150 N·cm/g or more.

2. The filtering medium according to claim 1, wherein the nonwoven fabric sheet contains non-crimped single fibers having a Young's modulus of 80 cN/dtex or more at a ratio of 50% or more of a total fiber mass, and contains non-crimped single fibers having a fineness of 7 cN/dtex or more at a ratio of 20% or more of a total fiber mass, and an apparent density is 0.17 g/cm$^3$ or less.

3. The filtering medium according to claim 1, wherein the nonwoven fabric sheet has a rough and fine structure.

4. The filtering medium according to claim 3, wherein the nonwoven fabric having the rough and fine structure has an efficiency of collecting 0.3 to 0.5 μm particles of 5 to 50%.

5. The filtering medium according to claim 1, wherein a weight variation rate is 25% or less.

6. The filtering medium according to claim 1, wherein a plurality of gas adsorbing substances are coated in layers in a direction of a filtering medium thickness.

7. The filtering medium according to claim 1, wherein the gas adsorbing substance is active carbon, and a pH of the filtering medium with the gas absorbing substance adhered thereto is 4.5 to 7.5.

8. The filtering medium according to claim 1, wherein the gas adsorbing substance is a mixed substance containing porous silica and a dihydrazide compound and/or a mixed substance containing active carbon and a dihydrazide compound.

9. The filtering medium according to claim 1, wherein the gas adsorbing substance is a mixed substance containing zinc oxide and sodium bicarbonate.

10. The filtering medium according to claim 1, wherein the gas adsorbing substance is adhered and fixed to the nonwoven fabric sheet with a water-soluble resin.

11. A high dust collecting filtering medium, wherein an electret nonwoven fabric is integrally laminated on the filtering medium as defined in claim 1.

12. A filter unit using the filtering medium as defined in claim 1.

13. A filter unit using the high dust collecting filtering medium as defined in claim 11.

14. The filtering medium according to claim 1, wherein a deodorizing filtering medium and a dust collecting filtering medium are integrated.

15. The filtering medium according to claim 1, wherein the gas adsorbing substance is present in an amount of 29 g/m$^2$ or more.

* * * * *